US011281735B2

(12) United States Patent
Hughes et al.

(10) Patent No.: US 11,281,735 B2
(45) Date of Patent: Mar. 22, 2022

(54) DETERMINING IMPORTANCE OF INVESTMENT IDENTIFIER TO CONTENT OF CONTENT ITEM

(71) Applicant: Apple Inc., Cupertino, CA (US)

(72) Inventors: Dominic J. Hughes, Menlo Park, CA (US); Anil A. Sewani, Sunnyvale, CA (US); Chi Wai Lau, Santa Clara, CA (US); Amogh Mahapatra, Santa Clara, CA (US); Gurumurthy D. Ramkumar, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 273 days.

(21) Appl. No.: 16/708,886

(22) Filed: Dec. 10, 2019

(65) Prior Publication Data

US 2020/0192954 A1    Jun. 18, 2020

Related U.S. Application Data

(60) Provisional application No. 62/778,784, filed on Dec. 12, 2018.

(51) Int. Cl.

| G06F 16/30 | (2019.01) |
| G06F 16/9535 | (2019.01) |
| G06F 16/9032 | (2019.01) |
| G06N 20/00 | (2019.01) |
| G06F 17/18 | (2006.01) |
| G06F 21/62 | (2013.01) |
| G06Q 40/00 | (2012.01) |

(52) U.S. Cl.
CPC .... *G06F 16/9535* (2019.01); *G06F 16/90332* (2019.01); *G06F 17/18* (2013.01); *G06F 21/6245* (2013.01); *G06N 20/00* (2019.01); *G06Q 40/00* (2013.01)

(58) Field of Classification Search
CPC ........ G06F 16/93; G06F 16/22; G06F 16/358; G06F 16/90324; G06F 16/9535; G06F 16/90332; G06Q 40/60; G06Q 30/0631
USPC ........ 707/609, 687, 705, 769, 790, 813, 821
See application file for complete search history.

(56) References Cited

U.S. PATENT DOCUMENTS

| 10,185,748 B1 * | 1/2019 | Ayzenshtat ....... G06F 16/90324 |
| 10,573,189 B2 * | 2/2020 | Sherman ............... G06F 16/328 |
| 10,846,274 B2 * | 11/2020 | Hatami-Hanza ........ G06F 16/22 |

(Continued)

*Primary Examiner* — Sana A Al- Hashemi
(74) *Attorney, Agent, or Firm* — Invoke

(57) ABSTRACT

In some implementations, a computing system can determine how important an investment identifier is to a content item that mentions the investment identifier. For example, a content item may describe a story, event, etc., related to an investment identifier. The content item may mention the investment identifier by mentioning the investment identifier, proxies for the investment identifier, or other equivalents associated with the investment identifier. The computing system can determine locations in the content item where the investment identifier is mentioned and/or how frequently the investment identifier is mentioned. Based on the locations and/or frequency of mentions, the computing system can determine an importance score that represents how important the investment identifier is to the story described by the content item. The importance score can be stored in metadata for the content item and used when determining which content items to present to a user.

21 Claims, 17 Drawing Sheets

(56) References Cited

U.S. PATENT DOCUMENTS

| | | | | |
|---|---|---|---|---|
| 2002/0165884 A1* | 11/2002 | Kreulen | ................ | G06F 16/93 |
| | | | | 715/259 |
| 2016/0085742 A1* | 3/2016 | Mahmud | ............... | G06F 40/242 |
| | | | | 704/9 |
| 2018/0364898 A1* | 12/2018 | Chen | .................... | G06F 3/0483 |

* cited by examiner

DETERMINING IMPORTANCE OF INVESTMENT IDENTIFIER TO CONTENT OF CONTENT ITEM

TECHNICAL FIELD

The disclosure generally relates to serving personalized media content to users while preserving user privacy.

BACKGROUND

Media content is often selected for delivery to a user based on various user preferences. In a typical content delivery system, a user device can collect preference information through explicit user input where the user specifies what content the user wishes to view or consume. The user device can collect information describing the user's content consumption behavior and infer the user's preferences based on historical content viewing patterns. The user device will send this preference information to a content server. The content server can evaluate media content based on the user preference information and select content for delivery to the user (e.g., user's device) based on the user preference information. While the typical content delivery system provides personalized content to the user, these types of content delivery systems require the user's personal preference information to be distributed outside of the user's device. Thus, these content delivery systems risk exposing the user's personal information, and thus risk violating user privacy.

SUMMARY

In some implementations, a computing system can deliver personalized content while preserving user privacy. For example, the computing system can include a content server that filters, deduplicates, and generates clusters of content items (e.g., articles, news stories, etc.) that are relevant to an investment identifier received in a request from a client device. The content server can send the clusters of content items to the requesting client. Upon receiving the clusters of content items, requesting client device can evaluate the content items based on user preferences stored on the user device and select a representative content item from one or more content item clusters. The selected content item can then be presented on a display of the user device. Thus, personalization of content item selection and presentation can be performed without distributing user preference data outside of the user device thereby preserving user privacy.

In some implementations, a computing system can determine how important an investment identifier is to a content item that mentions the investment identifier. For example, a content item may describe a story, event, etc., related to an investment identifier. The content item may mention the investment identifier by mentioning the investment identifier, proxies for the investment identifier, or other equivalents associated with the investment identifier. The computing system can determine locations in the content item where the investment identifier is mentioned and/or how frequently the investment identifier is mentioned. Based on the locations and/or frequency of mentions, the computing system can determine an importance score that represents how important the investment identifier is to the story described by the content item. The importance score can be stored in metadata for the content item and used when determining which content items to present to a user.

In some implementations, a computing system can disambiguate terms used in a content item based on encyclopedia data that has been conformed to a common taxonomy. For example, a common taxonomy can be defined based on a well-known news article taxonomy that organizes, classifies, and/or structures articles, content items, media items based on the subject matter discussed in the content items. Encyclopedia data (e.g.,) can be obtained that may provide definitions and/or descriptions of various objects, subjects, terms, etc., that may be used or mentioned in content items. The encyclopedia data can be used to disambiguate terms used in content items. However, the encyclopedia data may not conform to any common taxonomy and/or may be organized in a region-specific manner which may make the disambiguation process inefficient. Thus, the computing system can conform the encyclopedia data to the common taxonomy to make the disambiguation process more efficient.

Particular implementations provide at least the following advantages. User privacy can be safeguarded by performing content personalization on the user device and not distributing the user's personalization data to other computing devices (e.g., content servers). Content evaluation processes (e.g., term spotting, term disambiguation, investment identifier importance scoring, etc.) that require a large amount of computing resources (e.g., processing cycles, memory, electricity, network bandwidth, etc.) can be performed on a remote computing device (e.g., content server) while lightweight personalized content selection processes can be performed on the user device. Content clustering can allow a user device to select personalized content while avoiding presenting duplicative content in limited display space. Conforming digital information resources (e.g., encyclopedias) to a common taxonomy can increase the efficiency and speed of term lookup and disambiguation.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
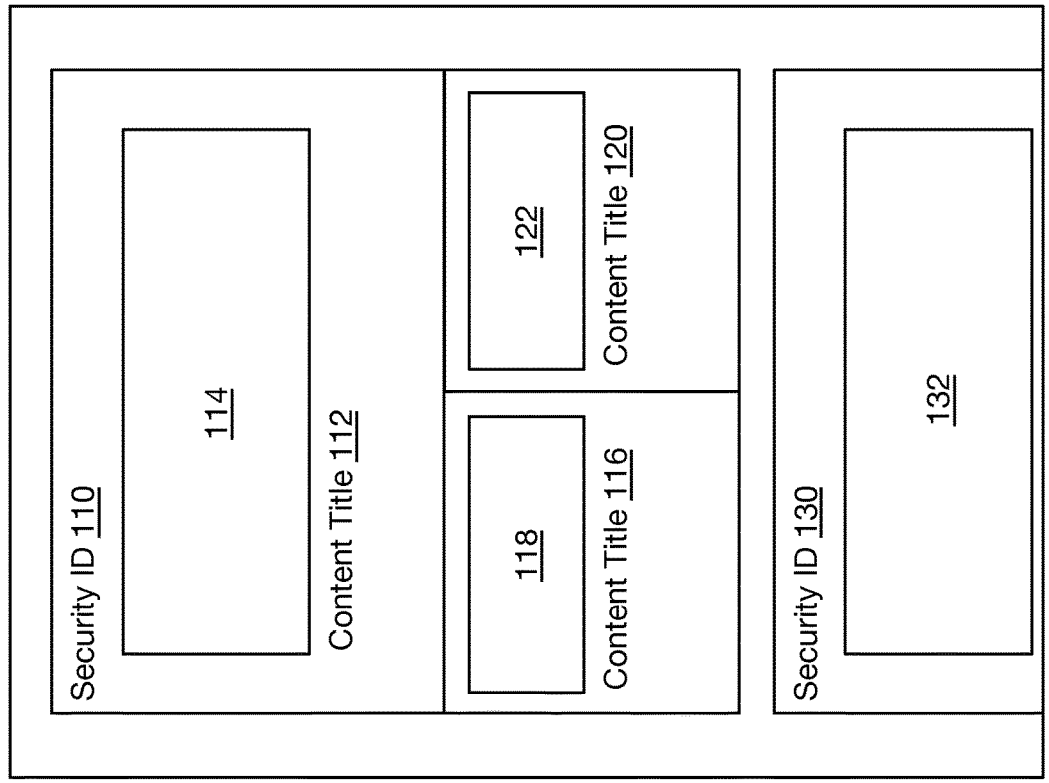
FIG. 1 is an example graphical user interface for presenting personalized content items related to investment identifiers requested by a user.

FIG. 1 is an example graphical user interface 100 for presenting personalized content items related to investment identifiers requested by a user. For example, graphical user interface (GUI) 100 can be a graphical user interface generated by an application (e.g., software application, stocks application, etc.) on a user device. The user of the user device can configure the application to present content items (e.g., news articles, media items, videos, text, pictures, etc.) related to investment identifiers of interest to the user. For example, the user may be interested in stories related to a security (e.g., stock, bond, mutual, fund, index, or other investment related security) in which the user owns shares or in which the user is interested in investing. The user can provide input to the application specifying the investment identifiers (e.g., stock symbols, etc.) in which the user is interested. The application can send the investment identifiers to a content server in a request for content items. The content server can send content items related to the specified security symbols to the application. The application can present personalized content items selected from the content items received from the content server on GUI 100.

In some implementations, GUI 100 can present selected content items in investment identifier groupings. For example, for each investment identifier configured by the user, the application can select a number (e.g., 2, 3, 4, etc.) of content items to present to the user on GUI 100. The selected content items can be grouped by investment identifier, as illustrated by FIG. 1. For example, for investment identifier 110, the application can present representations of a number (e.g., 3) different content items related to investment identifier 110. Each content item can be represented on GUI 100 by article metadata (e.g., title 112/116/120, a brief description, and/or image 114/118/122/132) representing and/or describing a corresponding selected content item. The user can provide input to GUI 100 to select a content item. In response to the user input, the application can request the contents of the content item from the content server. Upon receipt of the content item contents (e.g., text, image, video, etc.), the application can present the content item contents on a display of the user device.

In some implementations, GUI 100 can present selected content item groupings for multiple investment identifiers. For example, GUI 100 can present representations of selected content items associated with investment identifier 110 and investment identifier 130. For each investment identifier grouping, the application can present representations of a number (e.g., 3) different content items related each investment identifier. Each content item can be represented on GUI 100 by article metadata (e.g., title 112/116/120, a brief description, and/or image 114/118/122/132) representing and/or describing a corresponding selected content item.

Because only a limited number of content items are selected and/or presented for each investment identifier, the application should select content items that the user is most likely to read. To determine which articles the user is most likely to read, the application can evaluate each article in relation to user personalization data stored on the user device. By performing the personalization process on the user device, the content delivery system can avoid distributing the user's personalization data outside of the user device thereby reducing the chance that the user's personalization data might be used without the user's permission. Thus, local content personalization (e.g., personalization performed on the user's device) can provide enhanced privacy protections for the user's personal data.

Figure 2:
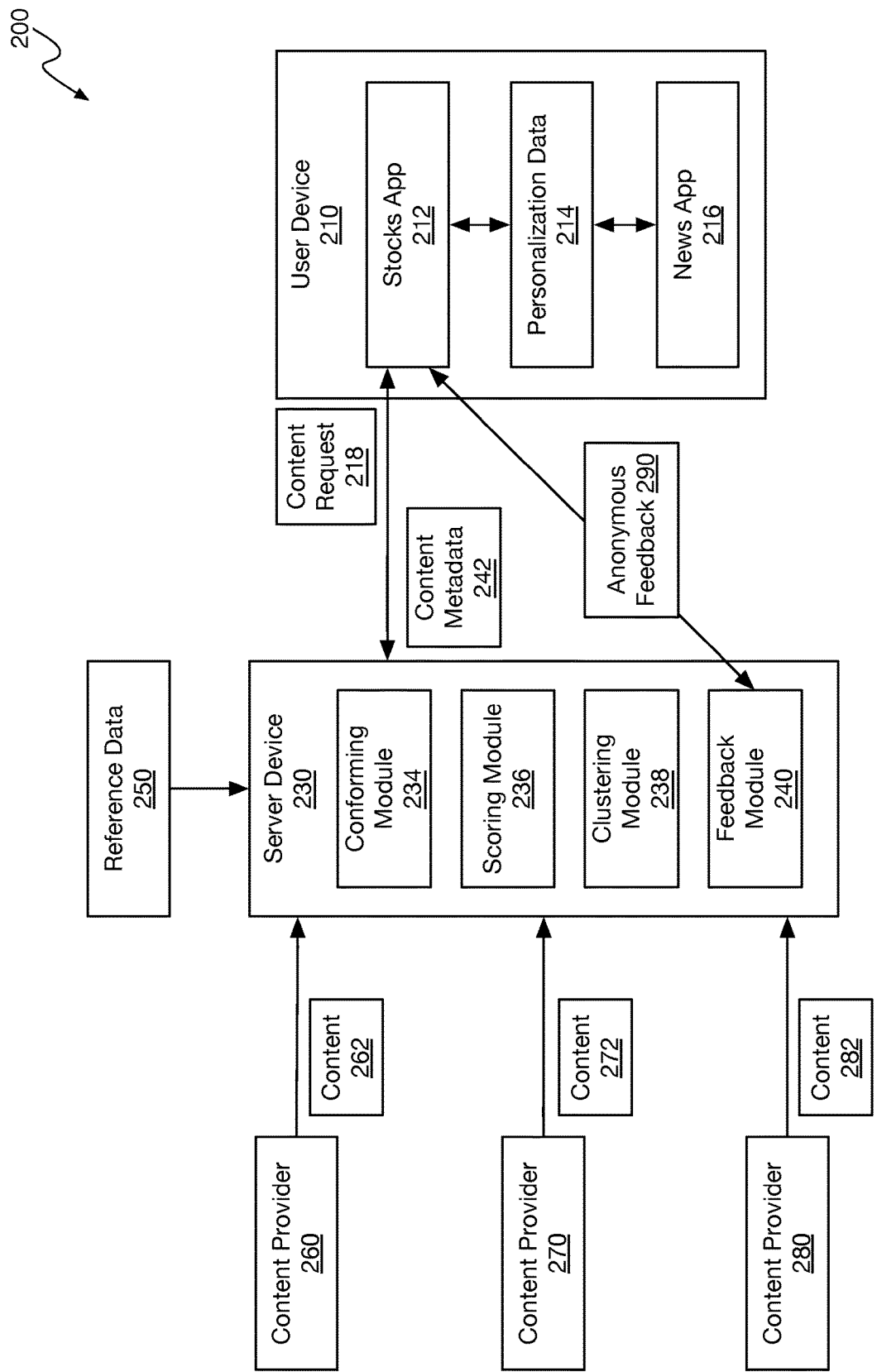
FIG. 2 is a block diagram of an example system for personalizing content delivery while preserving user privacy.

FIG. 2 is a block diagram of an example system 200 for personalizing content delivery while preserving user privacy. For example, system 200 can be a client-server computing system that is configured to select content items for presentation to a user based on personalization data that is stored locally on the user device. By performing the personalization of content selection on device, system 200 can avoid distributing personal, and potentially sensitive, user information to other devices (e.g., content servers) thereby reducing the risk that such personal user information might be viewed and/or used by systems not approved by the user.

In some implementations, system 200 can include user device 210. For example, user device 210 can be a computing device, such as a laptop computer, desktop computer, smartphone, tablet computer, smart watch, wearable device, in-car system, or other computing device.

In some implementations, user device 210 can include stocks app 212. For example, stocks app 212 can be an application configured to select and/or present investment (e.g., stocks, bonds, mutual funds, other securities, etc.) related content (e.g., news stories, events, etc.) to the user of user device 210. A user can, for example, provide input selecting one or more investment identifiers (e.g., stock tickers, stock symbols, mutual fund identifiers, bond identifiers, etc.) and stocks app 212 can select and present content related to the selected investment identifiers on a graphical user interface of stocks app 212.

Stocks app 212 can personalize the content presented to the user based on personalization data 214. For example, personalization data 214 can include user-specified personalization data, such as user selected content sources, publishers, topics, etc. Personalization data 214 can include behavior-based personalization data, such as content sources, topics, etc., determined based on historical reading patterns of the user (e.g., what topics, sources, etc., that the user has consumed or typically consumed in the past).

Personalization data 214 can be generated by stocks app 212 by receiving explicit user input from the user indicating the user's preferences for topics, content sources, etc. Personalization data 214 can be generated by stocks app 212 by monitoring user content consumption behavior over time.

Personalization data 214 can be generated by other applications (e.g., news app 216) on user device 210. For example, news app 216 (e.g., a general news content delivery application) can generate personalization data 214 by receiving explicit user input from the user indicating the user's preferences for topics, content sources, etc. News app 216 can generate personalization data 214 by monitoring user content consumption behavior over time. News app 216 can share personalization data 214 with stocks app 212 so that stocks app 212 can select and present content personalized for the user based on personalization data 214.

In some implementations, stocks app 212 can be configured with investment identifiers of interest to the user of user device 210. For example, the user can provide input to stocks app 212 indicating investment identifiers (e.g., stock ticker symbols, fund symbols, etc.) to which the user would like to subscribe. Stocks app 212 can then request content items corresponding to the investment identifiers to which the user has subscribed. For example, stocks app 212 can send one or more investment identifiers to server device 230 in content request 218.

In some implementations, system 200 can include server device 230. For example, server device 230 can be a computing device configured to serve content (e.g., news articles, stocks articles, videos, images, other content items) to client devices (e.g., user device 210) over a network (e.g., the Internet, wide area network, local area network, wireless network, etc.). Server device 230 can obtain content items (e.g., content 262/272/282) from content providers 260/270/280 (e.g., news sources, news publishers, etc.).

Server device 230 can classify, categorize, filter, and/or tag the obtained content items based on reference data 250 (e.g., dictionaries that specify terms, encyclopedias that define or give context to terms, taxonomies that aid in classification). For example, server device 230 can obtain encyclopedia data (e.g., a digital information resource) that defines the terms used for classification of content received from the content providers 260, 270, 280. To make the classification (e.g., disambiguation) process more efficient, conforming module 234 can automatically conform the encyclopedia data (e.g., potentially from different geographic regions, having different categorization/organization structures for the encyclopedia data) to a common taxonomy such that the classification structure of the common taxonomy is used across all encyclopedia data, regardless of regional origin of the encyclopedia data.

Server device 230 can include scoring module 236 that is configured to generate various scores that can be used for clustering and/or selecting content items to present to the user of a user device. For example, scoring module 236 can generate importance scores for the various investment identifiers mentioned (e.g., occurring, included, etc.) in a content item. For example, an importance score generated for an investment identifier (e.g., stock ticker) can represent how important the investment identifier is to the story described by the content item. Stated differently, the importance score for an investment identifier can be interpreted to determine if the security (e.g., company, company stock, bond, other security, etc.) corresponding to the investment identifier is a focus of the story described by the content item or is just mentioned as peripherally related to something in the content item. For example, a high importance score can indicate that the investment identifier is a focus of the story, while a low importance score can indicate that the investment identifier is just tangentially related to the story. Scoring module 236 can generate other types of scores as described in further detail below.

Server device 230 can include clustering module 238. For example, clustering module 238 can be configured to cluster content items that have similar content (e.g., describe similar stories). For example, to avoid presenting content items that describe the same event or describe similar stories to the user, clustering module 238 can assign the same cluster identifier to content items that describe similar stories. These cluster identifiers can be provided to user device 210 when sending content to user device 210 so that user device 210 can avoid selecting content items from the same cluster (e.g., that tell the same story, but come from different content providers). After clustering content items, server device 230 can send content metadata 242 to stocks app 212 on user device 210 so that stocks app 212 can select which content items to present to the user based on content metadata 242 and personalization data 214, as described herein.

Server device 230 can include feedback module 240. For example, server device 230 can receive anonymous feedback 290 from stocks app 212. Anonymous feedback 290 can include information describing and/or identifying content items that the user has viewed and/or consumed. Anonymous feedback 290 can include characteristics and/or preferences associated with the user that can be used to generate an anonymous architype definition or that can be used to classify the user's viewing behavior according to an established architype. Anonymous feedback 290 can include the results of experiments performed on user device 210 in an effort to tune the personalization algorithms (e.g., algorithm weight tuning described below) used to select content items to present to the user. In all cases, anonymous feedback 290 includes anonymized data, such that the data cannot be traced back or linked to the user of user device 210 and/or user device 210.

Conforming module 234, scoring module 236, clustering module 238, and feedback module 240 are a few of the software modules that may be configured on server device 230. Server device 230 may include other software modules as described further below.

Figure 3:
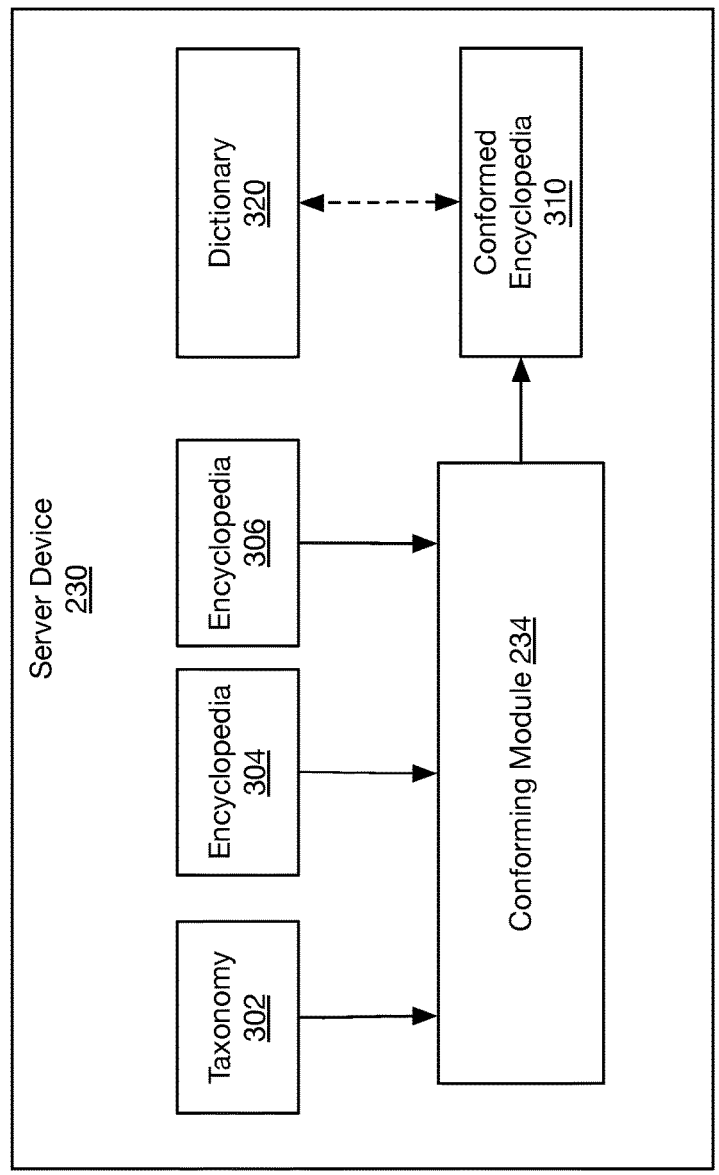
FIG. 3 is a block diagram of an example system for conforming encyclopedia data to a common taxonomy.

FIG. 3 is a block diagram of an example system 300 for conforming encyclopedia data to a common taxonomy. For example, system 300 can correspond to system 200, described above. System 300 can include conforming module 234 configured to conform encyclopedia 304 and/or encyclopedia 306 to a common taxonomy 302. Stated differently, conforming module 234 can reorganize the data included in encyclopedia 304 and/or 306 such that the organization of the data in the encyclopedias conforms to the organization and/or classification structure defined by taxonomy 302.

In some implementations, taxonomy 302 can correspond to a well-known and frequently used taxonomy used by major news organizations for organizing and presenting news articles (e.g., content items) to consumers. System 300 can use taxonomy 302 to organize and/or reorganize encyclopedia data that may not already conform to taxonomy 302. For example, encyclopedia 304 may be a lightly or loosely managed, crowd sourced encyclopedia. While the information included in encyclopedia 304 may be useful, the information may not be consistently organized according to a predefined taxonomy or category hierarchy. To make the organization of encyclopedia 302 more predictable, and thereby increase the efficiency with which the encyclopedia data can be accessed and used, conforming module 234 can conform encyclopedia 304 to taxonomy 302.

Similarly, encyclopedia 306 may be an encyclopedia of information generated by people who live in a geographic region (e.g., France, Germany, India, etc.) where news articles and information are organized and/or classified differently than other parts of the world. To enable system 200 to efficiently utilize the information in encyclopedia 306, conforming module 234 can rearrange and/or reorganize encyclopedia 306 such that encyclopedia 306 conforms to taxonomy 302. Thus, both encyclopedia 304 and/or encyclopedia 306 can be conformed to a common taxonomy 302 which allows the encyclopedia data to be efficiently and predictably accessed and used by system 200. After conforming module 234 generates conformed encyclopedia 310 based on taxonomy 302, encyclopedia 304, and/or encyclopedia 306, system 200 can use conformed encyclopedia 310 in conjunction with dictionary 320 (described further below) to evaluate, classify, and/or cluster content items before distributing content items to client devices (e.g., user device 210). For example, finance and investment related terms (e.g., words, phrases, names, tokens, identifiers, etc.) in dictionary 320 can be linked to descriptions or references to the dictionary terms in conformed encyclopedia such that the meanings of the dictionary terms can be defined, and the usage of the dictionary terms in content items can be disambiguated with respect to other non-finance related meanings of the terms that might exist, as described further below.

Figure 4:
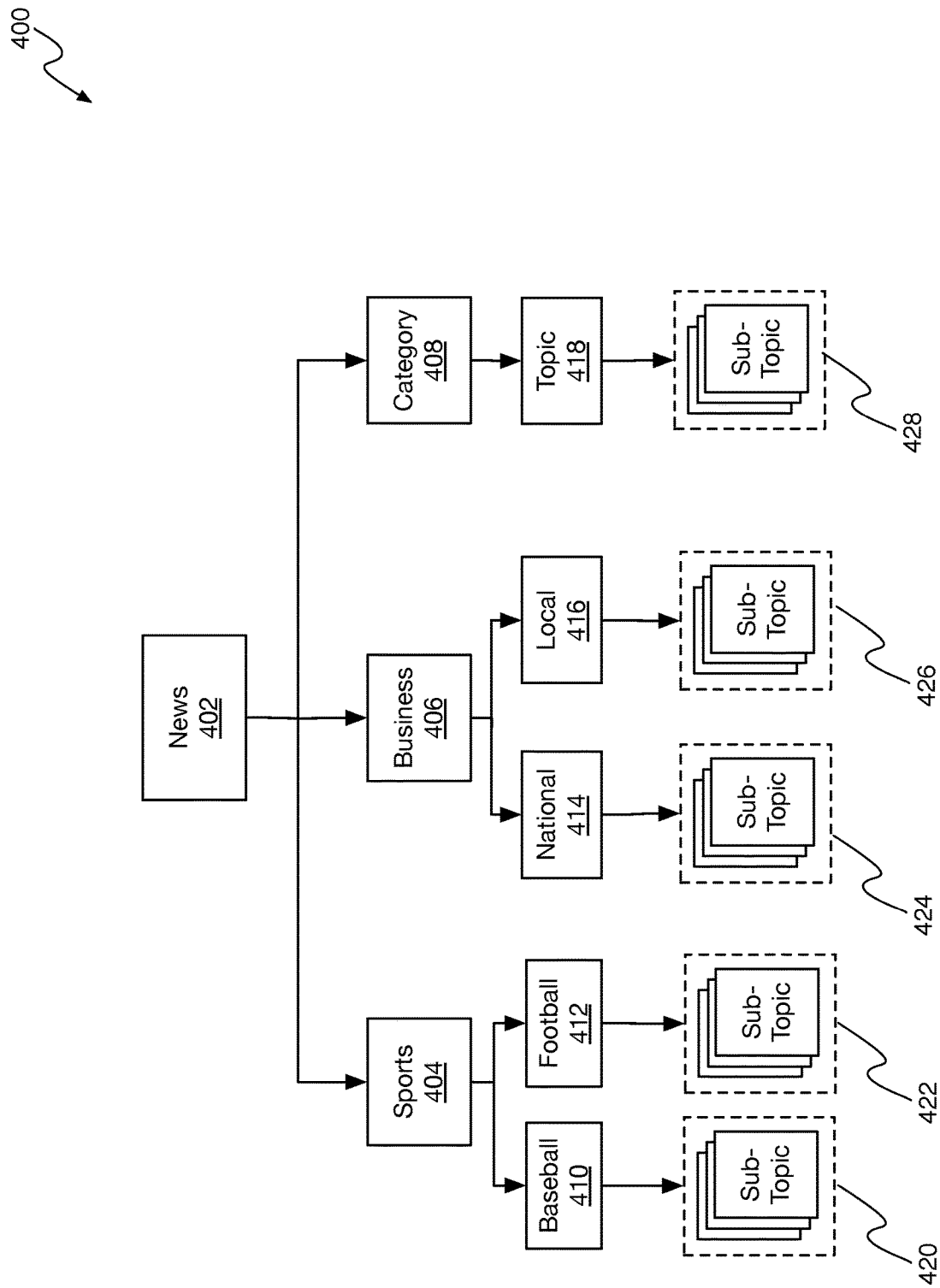
FIG. 4 illustrates an example taxonomy for conforming encyclopedia data to a common taxonomy.

FIG. 4 illustrates an example taxonomy 400 for conforming encyclopedia data to a common taxonomy. Taxonomy 400 (i.e., taxonomy 302) can correspond to a common, well-known taxonomy for organizing news articles in newspapers, news websites, and the like. For example, taxonomy 400 can correspond to news article/subject taxonomies used in the United States by major news organizations. For example, FIG. 4 represents taxonomy 400 as a hierarchical tree structure with the broadest categories (e.g., news 402, sports 404, business 406, other categories 408, etc.) at the top of the tree, narrower topics in the middle of the tree (e.g., baseball 410, football 412, national news 414, local news 416, other topics 418, etc.), and the narrowest, most specific categories at the bottom of the tree (e.g., subtopics 420-428).

When server device 230 receives reference data 250, including encyclopedia 304 and/or encyclopedia 306, encyclopedia 304 and/or encyclopedia 306 may be organized according to taxonomies (e.g., organization and/or classification systems) that are different than each other and/or different than taxonomy 400. Thus, the data described by encyclopedia 304 and/or 306 may be organized and/or represented by a different tree structure than taxonomy 400. For example, encyclopedia 304 may include sports category 404 under national and/or local news, instead of under the top-level news category 402. Encyclopedia 306 may include sports category 404 under a lifestyle subtopic, instead of under the top-level news category.

To conform encyclopedia 304 and/or 306 to topology 400, conforming module 234 can reorganize the tree structures of encyclopedia 304 and/or 306 such that the encyclopedias conform to topology 400. For example, if each subject (e.g., person, place, event, business, country, etc.) described by encyclopedia 304/306 is described in data unit (e.g., web page, document, etc.), each data unit can be linked to other, related data units within the encyclopedia. For example, data units can be linked when they have some sort of topical and/or categorical relationship. To conform the data units in encyclopedia 304/306 to taxonomy 400, conforming module 234 can add and/or change links between data units and categories such that the data unit/category linkages conform the taxonomy 400. Thus, if encyclopedia 304/306 links sports category 404 under a local news category, conforming module 234 can link or relink sports category 404 to the top-level news category 402. Conforming module 234 can perform this linking/relinking process for each category and/or data unit in encyclopedia 304/306 that does not conform to the organizational structure defined by taxonomy 400 until the structure of data units in encyclopedia 304/306 correspond to taxonomy 400.

Figure 5:
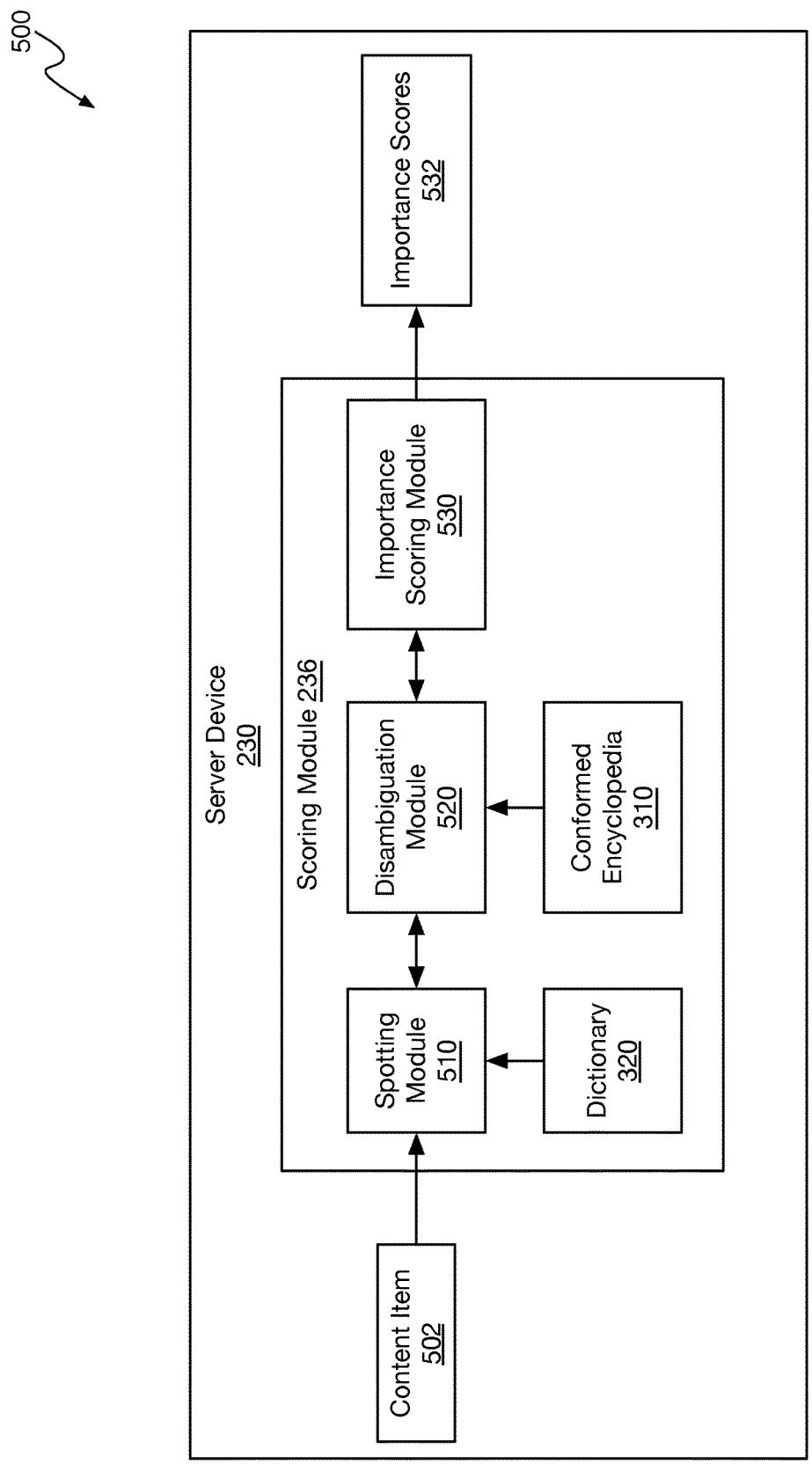
FIG. 5 is a block diagram of an example system for generating an importance score for investment identifiers included in a content item.

FIG. 5 is a block diagram of an example system 500 for generating an importance score for investment identifiers included in a content item. For example, system 500 can correspond to system 200. System 500 can include scoring module 236 of server device 230, as described above. For example, when a content item (e.g., content item 502) is received by server device 230, scoring module 236 can generate scores based on various characteristics of the content item. For example, scoring module 236 can generate an importance score for each investment identifier mentioned (e.g., occurring) in the content item.

Investment identifiers can be mentioned in a variety of ways. For example, an investment identifier can be mentioned directly (e.g., explicitly) or indirectly (e.g., implicitly). An investment identifier can be mentioned explicitly. For example, the identifier (e.g., stock ticker) for a particular security can be explicitly stated or mentioned in the content item. An investment identifier can be mentioned indirectly or implicitly. For example, a term associated with or related to the investment identifier can be mentioned in the content item. Such terms can be considered equivalents to an explicit mention of the investment identifier. For example, if the investment identifier corresponds to a company, mentions of a person (e.g., executive, board member, founder, key personnel, etc.) related to the company can be considered an equivalent to mentioning the investment identifier for the company. Similarly, a company might have a name, nickname, or other alias that is commonly used to refer to the company. When a content item mentions the name, nickname, or alias for the company, these terms can be considered equivalent to a mention of the investment identifier for the company. Likewise, a company might produce various products (e.g., smartphones, computers, smartwatches, wearable devices, etc.). When a content item mentions a product produced by the company, these terms can be considered equivalent to a mention of the investment identifier for the company. These terms (e.g., the investment identifier and equivalents) can be configured or stored in dictionary 320 for each security traded on a securities exchange (e.g., stock exchange).

In some implementations, scoring module 236 can include spotting module 510. For example, spotting module 510 can be configured to spot (e.g., detect, locate, etc.) the occurrence of terms in dictionary 320 in content item 502. For example, spotting module 510 can compare content item 502 to the terms in dictionary 320 to determine the locations in content item 502 where the terms in dictionary 320 are mentioned.

When spotting module 510 finds an occurrence of a dictionary term in content item 502, spotting module 510 can determine various location characteristics for each occurrence of the mentioned term. For example, the location characteristics can include a character count (e.g., or time index for video or audio) indicating far into the content item from the beginning of the content item the dictionary term was found. The location characteristics can include an indication of the content item structural element (e.g., title, heading, introduction, summary, paragraph, abstract, etc.) in which the dictionary term was found. The location characteristics can include the relative location of the found term in relation to other terms found in the content item. For example, the relative location information can indicate which term occurred in the content item first (e.g., closest to the beginning). The relative location information can indicate the distance (e.g., character count for text, elapsed time for audio or video, etc.) between the occurrence of the terms. Spotting module 510 can determine the frequency of occurrence for each term mentioned in content item 502. For example, for each term found by spotting module 510, spotting module 510 can determine the number of times the term was found in content item 510. Spotting module 510 can store the spotting data (e.g., term occurrence location characteristics, term frequency of occurrence, etc.) for each term found in content item 502 and provide the spotting data to other modules for evaluation.

In some implementations, scoring module 236 can include disambiguation module 520. For example, disambiguation module 520 can be configured to disambiguate terms that may have multiple meanings or definitions. Disambiguation module 520 can disambiguate terms based on the term definitions and descriptions stored in conformed encyclopedia 310. More specifically, disambiguation module 520 can determine whether the terms found by spotting module 510 in content item 502 actually have the same meanings as the finance and investment terms included in dictionary 320 or whether the terms found by spotting module 510 in content item 502 actually refer to some other meaning. For example, disambiguation module 520 can determine whether the term "apple" used in content item 502 refers to "apple" the fruit or "Apple" the company as used in dictionary 320.

To disambiguate terms, disambiguation module 520 can evaluate the terms spotted by spotting module 510 and/or other words, phrases, tokens, etc., used in content item 502. For example, by evaluating the contents of content item 502 as a whole and/or with reference to conformed encyclopedia 310, disambiguation module 520 can determine which definition of a term is being used in content item 502. Again, using the dictionary term "apple" as an example, if content item 502 includes words and phrases related to agriculture, baking, recipes, fruit, trees, etc., then disambiguation module 520 can determine that the term "apple" as used in content item 502 refers to the fruit. Disambiguation module 520 can compare the terms, words, phrases, etc., mentioned in content item 502 to the various "apple" descriptions in conformed encyclopedia 310. If an "apple" encyclopedia description for apple the fruit includes similar terms, words, phrases, as those mentioned in content item 502, then disambiguation module 502 can determine that the "apple" term mentioned in content item 502 corresponds to the "apple" fruit description in conformed encyclopedia 310. If an "apple" encyclopedia description for Apple the company includes similar terms, words, phrases, as those mentioned in content item 502, then disambiguation module 502 can determine that the "apple" term mentioned in content item 502 corresponds to the "apple" company description in conformed encyclopedia 310. Disambiguation module 520 can then link the "apple" term used in content item 502 to the appropriate description in conformed encyclopedia 310 thereby providing a specific definition for the term "apple" as used in content item 502. For example, the linking can be done by mapping (e.g., tagging with an encyclopedia description identifier, subject identifier, or page identifier) the occurrence of the term "apple" in content item 502 to the corresponding definition in conformed encyclopedia 310.

In some implementations, for terms that have definitions that do not relate to the financial terms, disambiguation module 520 can tag the terms with an indication that the terms are not finance or investment related terms. Using the "apple" example again, if the term "apple" in content item 502 is related to "apple" the fruit, then disambiguation module 520 can tag the occurrence of the term "apple" in content item with data indicating that the term is not a finance and investment related term. Thus, this particular occurrence of the term "apple" in content item 502 can be ignored when generating importance scores for investment identifiers (e.g., a stock ticker symbol for Apple the company), as described below.

After disambiguation module 520 determines the appropriate definitions for terms in content item 502, importance scoring module 530 can generate importance scores for each security symbol mentioned in content item 502. For example, for the terms in content item 502 that have been linked to encyclopedia definitions that match the definitions of the terms in dictionary 320, importance scoring module 530 can determine the investment identifiers corresponding to those terms and generate importance scores for the investment identifiers based on the spotting data associated with the terms.

In some implementations, importance scoring module 530 can generate an importance score for investment identifiers using a machine learning (ML) model. For example, importance scoring module 530 can generate features for the ML model corresponding to the spotting data generated for each term associated with the investment identifiers. The ML model features can include, for example, how many times (e.g., frequency of occurrence) an investment identifier is mentioned in content item 502. The ML model features can include the various location characteristics (e.g., how many characters from the beginning of content item 502, structural locations where the investment identifier is mentioned in content item 502, etc.) for the mentions of the investment identifier. The ML model can be generated based on these spotting features and content item 502 can be evaluated using the ML model to generate a score for the investment identifier. For example, the importance score for an investment identifier can be generated based on the location characteristics of the various mentions of the investment identifier on the content item 502 and/or the number of times the investment identifier was mentioned in content item 502, as described above. The ML model will generate higher importance scores for investment identifiers that are determined to be the focus of content item 502. The ML model will generate lower importance scores for investment identifiers that are not the focus of (e.g., tangentially mentioned in) content item 502. After generating the importance scores for each investment identifier mentioned in content item 502, importance scoring module 530 can store the importance scores 532 in metadata associated with content item 502.

Figure 6:
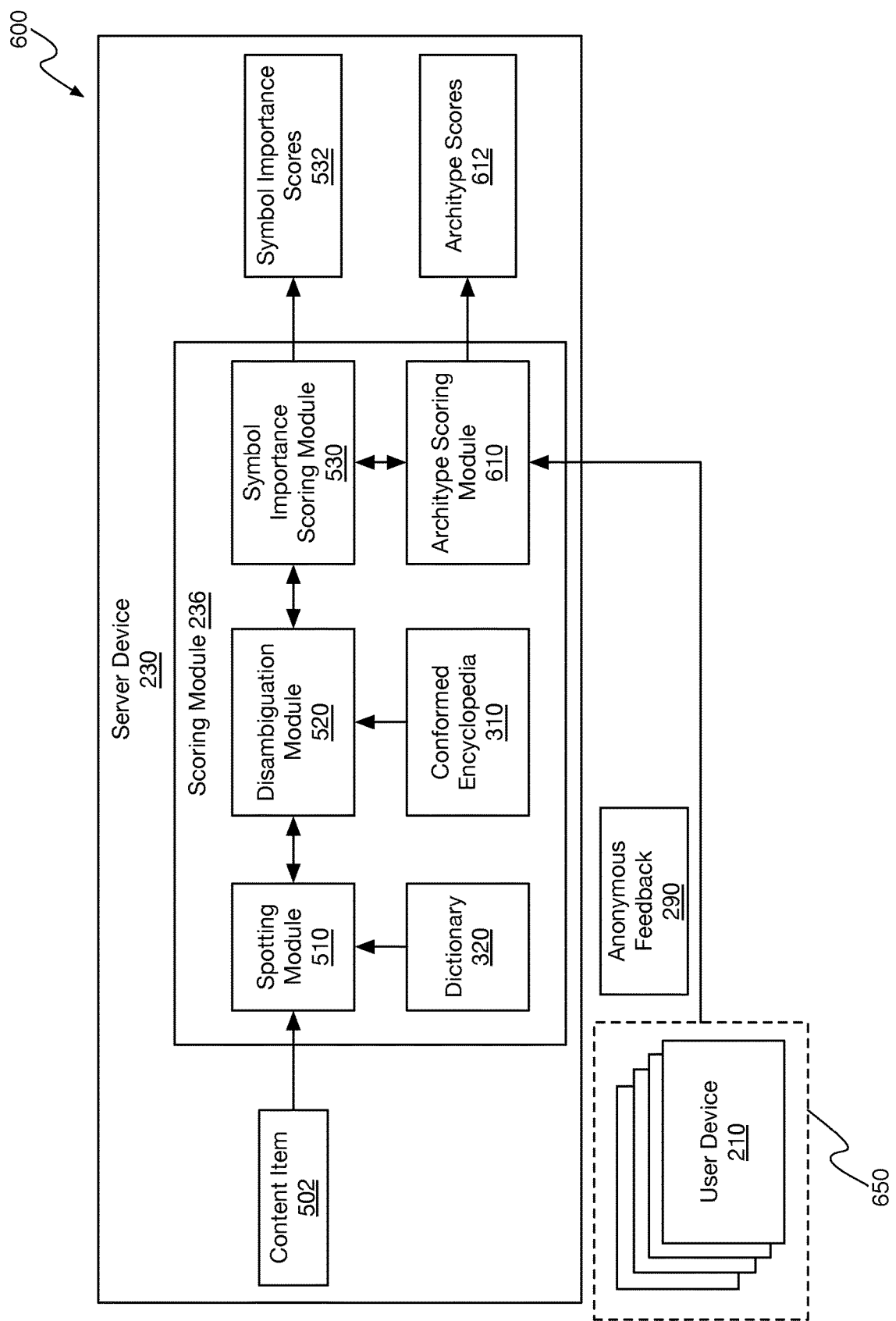
FIG. 6 is a block diagram of an example system for generating architype scores for a content item.

FIG. 6 is a block diagram of an example system 600 for generating architype scores for a content item. For example, system 600 can correspond to system 200 and/or system 500 described above. System 600 can include scoring module 236, as described above.

In some implementations, scoring module 236 can include architype scoring module 610. For example, architype scoring module 236 can generate an architype score 612 for content item 502 that indicates the likelihood that a user with certain characteristics, traits, and/or interests that define an architype (e.g., group or class of users having the same characteristics, traits, and/or interests) will read or consume content item 502. For example, an architype can be defined based on user characteristics, such as age, geographic location, gender, etc. An architype can be defined based on user-specified interests, such as subscriptions to specific investment identifiers, content providers, etc. An architype can be defined based on device detected interests, such as content consumption history that indicates topics, content providers, investment identifiers, etc., in which the user is interested.

In some implementations, architype scoring module 610 can generate architype scores based on anonymous user feedback. For example, a user of user device 210 (and users of other user devices) can provide input to user device 210 to allow user device 210 to provide anonymous real-time user feedback to system 600 (e.g., server device 230). When the user has opted-in to (e.g., provided input to allow) providing the anonymous feedback, user device 210 (e.g., stocks app 212, news app 216, etc.) can monitor the user's content consumption behavior (e.g., news topics consumed, securities topics consumed, content publishers consumed, etc.) and send anonymous data (e.g., data that cannot be used to identify a specific user or device) describing the user's content consumption behavior to server device 230 in anonymous feedback 290. When the user has opted-in to providing the anonymous feedback, user device 210 may also anonymously send user characteristic data (e.g., age, gender, location, etc.), securities subscription information, and other information that may be included in personalization data 214.

For example, stocks app 212 can determine when a user of user device 210 consumes a content item presented by stocks app 212 on user device 210. In response to determining that the user has consumed a content item, stocks app 212 can store consumption information that includes an identifier for the content item and the investment identifiers that are mentioned in the content and to which the user has subscribed. Stated differently, the consumption information can include the intersection of the investment identifiers mentioned in the content item and the investment identifiers to which the user has subscribed. Thus, if the content item mentions investment identifiers X, Y, and Z, and the user subscribes to investment identifiers X and Z, the consumption information generated when the content item is consumed will include the identifier for the content item and the investment identifiers X and Z.

The user may provide input to opt-out of (e.g., disallow) providing anonymous feedback 290 at any time. For example, in response to receiving input indicating the user wishes to opt-out of providing the anonymous real time feedback, user device 210 can stop monitoring user behavior and stop sending anonymous feedback 290.

In some implementations, architype scoring module 610 can generate architype definitions. For example, architype scoring module 610 can generate different architype definitions for each different combination of user characteristics, securities subscription information, and/or user personalization data received in anonymous feedback 290. Continuing the example above, one architype definition can correspond to users who subscribe to investment identifier X. Another architype definition can correspond to users who subscribe to investment identifier Y. Another architype definition can correspond to users who subscribe to investment identifiers X and Z.

Based on the anonymous feedback 290, architype scoring module 610 can determine a score for each architype that represents the likelihood that users who match the architype will read a content item that mentions certain topics and/or investment identifiers. For example, based on the investment identifiers and/or importance scores generated for a content item and the past content item consumption behaviors of users who correspond to a particular architype, architype scoring module 610 can generate a score for each architype that represents the likelihood that users who match the architype will read a content item that mentions certain topics and/or investment identifiers. For example, if a content item mentions investment identifiers X, Y, and Z, and X has an importance score of 0.6, Y has an importance score of 0.2, and Z has an importance score of 0.8, architype scoring module 610 can determine that users who subscribe to X and Z (e.g., corresponding to architype X/Z) will read the content item 70% of the time based on the mentioned investment identifiers and corresponding importance scores.

In some implementations, architype scoring module 610 can generate the scores for each architype based on a machine learning model. For example, the anonymous user characteristics, securities subscription information, and/or user personalization data that are used to define an architype can be used as features that define a machine learning model. The machine learning model can be trained based on the anonymous feedback 290 that indicates anonymous user characteristics, securities subscription information, and/or user personalization data, and content items consumed by various users such that the models are predictive of which content items users who conform to specific architypes will consume. The output of the machine learning model can be a score that represents the likelihood that a user who conforms to the architype represented by the model will read a content item. For example, various architype machine learning models can be used to evaluate the likelihood that each architype will consume content item 502. The architype machine learning model can be dynamically updated based on the real time feedback provided by anonymous feedback 290. Thus, architype scoring module 610 can generate architype scores 612 for content item 502 corresponding various user architypes by evaluating content item 502 (e.g., the content and metadata associated therewith) using the machine learning models for each architype.

Figure 7:
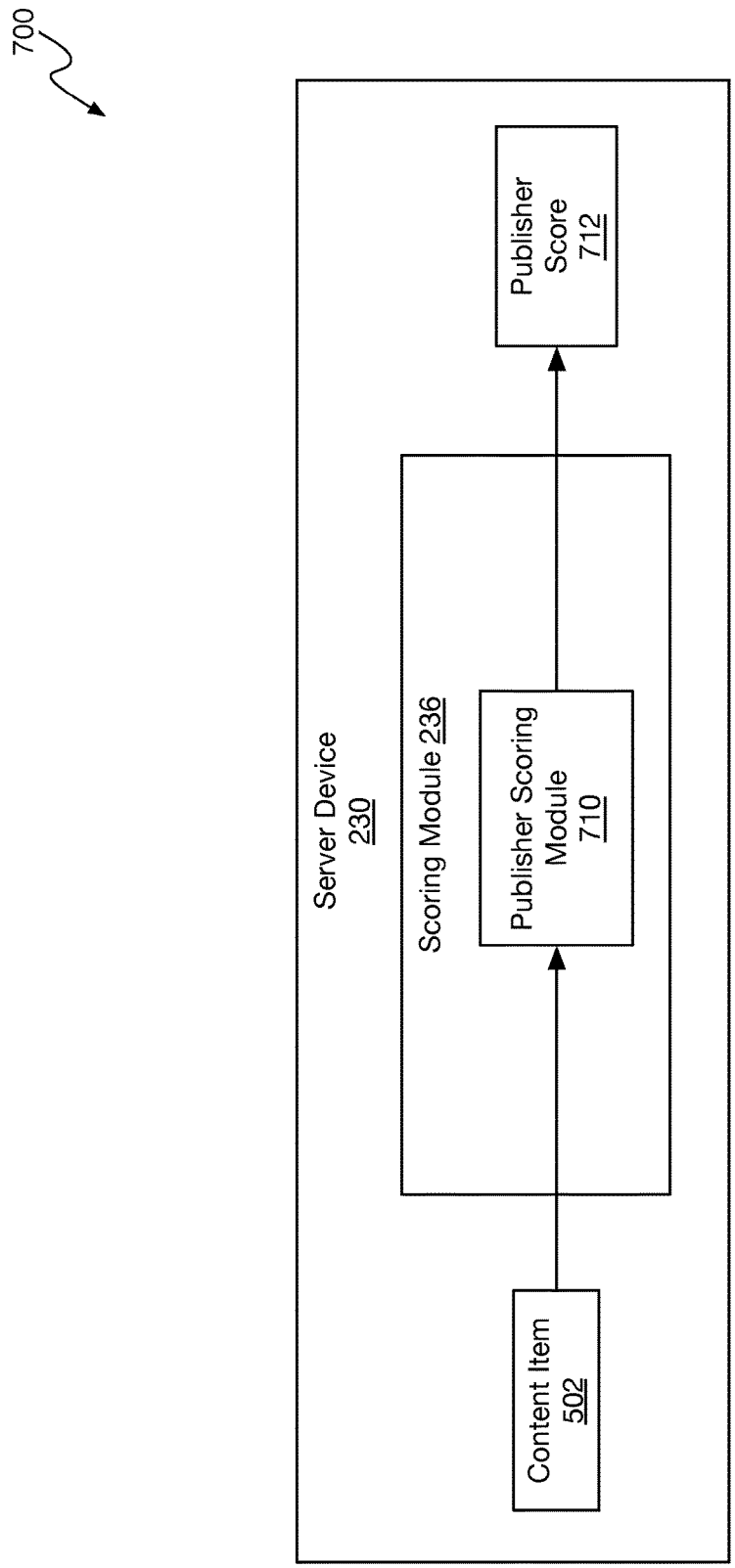
FIG. 7 is a block diagram of an example system for generating a publisher score.

FIG. 7 is a block diagram of an example system 700 for generating a publisher score. For example, system 700 can correspond to system 200 described above. System 700 can include scoring module 236.

In some implementations, scoring module 236 can include publisher scoring module 710. For example, publisher scoring module 710 can generate a publisher score 712 for content item 502 based on which publisher provided, published, or generated content item 502. Publisher score 712 can be generated based on data that defines a mapping of publishers to corresponding scores that represents a value ranking corresponding to the quality, respectability, popularity, esteem, and/or other characteristic of the corresponding publisher. The mapping can be configured by a person and stored on server device 230 for scoring module 236 and/or publisher scoring module 710 to access. The mapping can be automatically generated based on user reviews of the various publishers obtained by server device 230.

When content item 502 is received from a publisher (e.g., content provider 260/270/280), publisher scoring module 710 can determine the identity of the publisher that published content item 502 and can generate publisher score 712 based on the mapping described above. For example, publisher scoring module 710 can use a publisher identifier associated with content item 502 as an index to the mapping to obtain a publisher score corresponding to the publisher identifier. Publisher scoring module 710 can then store the publisher score in the metadata for content item 502.

Figure 8:
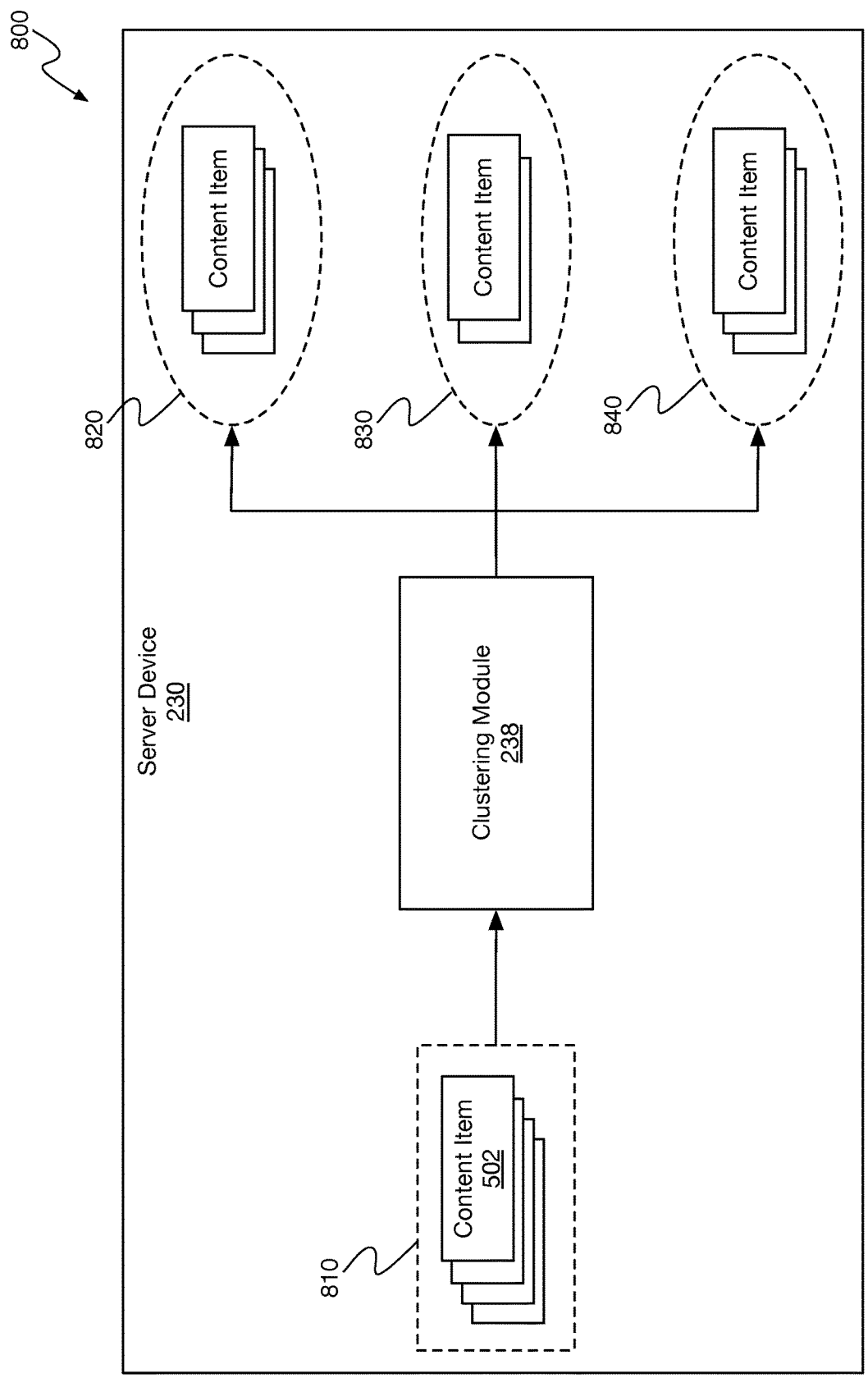
FIG. 8 is a block diagram of an example system for clustering content items.

FIG. 8 is a block diagram of an example system 800 for clustering content items. For example, system 800 can correspond to system 200 described above. As described above with reference to system 200, system 800 can include clustering module 238.

In some implementations, clustering module 238 can cluster content items that include similar content. For example, different publishers of content (e.g., news articles, stocks articles, videos, etc.) will often generate content that describes the same event, story, etc. When selecting content items for presentation to a user, it is desirable to avoid presenting content that tells the same story. Thus, when content items are received from various content providers (e.g., content providers 260/270/280) clustering module 238 can analyze and/or compare the content items to determine which content items describe the same story and/or event. For example, when content items 810 are received, clustering module can compare content item 502 to other content items 810 to determine which content items describe the same story or event as content item 502. The comparison can be performed by evaluating the metadata of the content items that indicates which investment identifiers are important to the content items, as described above with reference to importance scoring module 530. The comparison can be performed by evaluating the definitions of terms included in the content items, as determined using conformed encyclopedia 310 described above. For example, different content items that use the same terms having the same definitions may be describing the same story or event.

In some implementations, the content items and/or terms therein can be compared using well-known similarity algorithms (e.g., Jaccard similarity algorithms, cosign similarity algorithms, sematic similarity algorithms, etc.) to generate a similarity score. For example, clustering module 238 can compare content items provided by different content providers and generate a score for each content item that indicates how similar the content items are. If the score is above (or below) a threshold value, then the two content items can be determined to be similar. Clustering module 238 can then group similar content items into content item clusters. For example, each content item cluster (e.g., cluster 820, cluster 830, cluster 840, etc.) can be assigned a cluster identifier (e.g., story identifier). Each content item that belongs to the same cluster can be assigned the same cluster identifier. The same cluster identifier can be stored in the metadata for each content item that is associated with the same cluster.

Referring back to FIG. 2, in response to receiving content request 218 that identifies an investment identifier from stocks app 212 on user device 210, server device 230 can send metadata 242 for content items associated with the investment identifier to stocks app 212. For example, server device 230 can determine which content items in content 262, 272 and/or 282 mention the investment identifier received in content request 218 and send the metadata for those content items to stocks app 212. The content metadata can include for each content item the content item identifier, the cluster identifier for the content item, a publisher identifier, the importance scores generated for the investment identifiers mentioned in the content item (e.g., a mapping of investment identifiers to corresponding importance scores), the architype scores generated for the content item (e.g., a mapping between architype identifiers and architype scores), and the publisher score generated for the content item. Stocks app 212 can then select which content items to present to the user based on content metadata 242.

FIG. 9 through FIG. 12 are block diagrams of example systems 900-1200 for personalized selection of content items by a client device. For example, systems 900-1200 can correspond to system 200. Each of systems 900-1200 describe different aspects of or processing steps in the personalized content selection process. When combined together, systems 900-1200 describe a client-side system for personalized selection of content items while protecting user privacy. As described above, user device 210 of system 200 (e.g., system 900-1200) can include stocks app 212. Stocks app 212 can receive content item metadata 920 for content items 910 (e.g., content items 912-918) corresponding to an investment identifier sent to server device 230, as described above. Stocks app 212 can select a number (e.g., 2, 3, etc.) of content items from content items 910 to present to the user based on content item metadata 920 and/or personalization data 214. Thus, stocks app 212 on user device 210 can select and present content items personalized for the user of user device 210.

Figure 9:
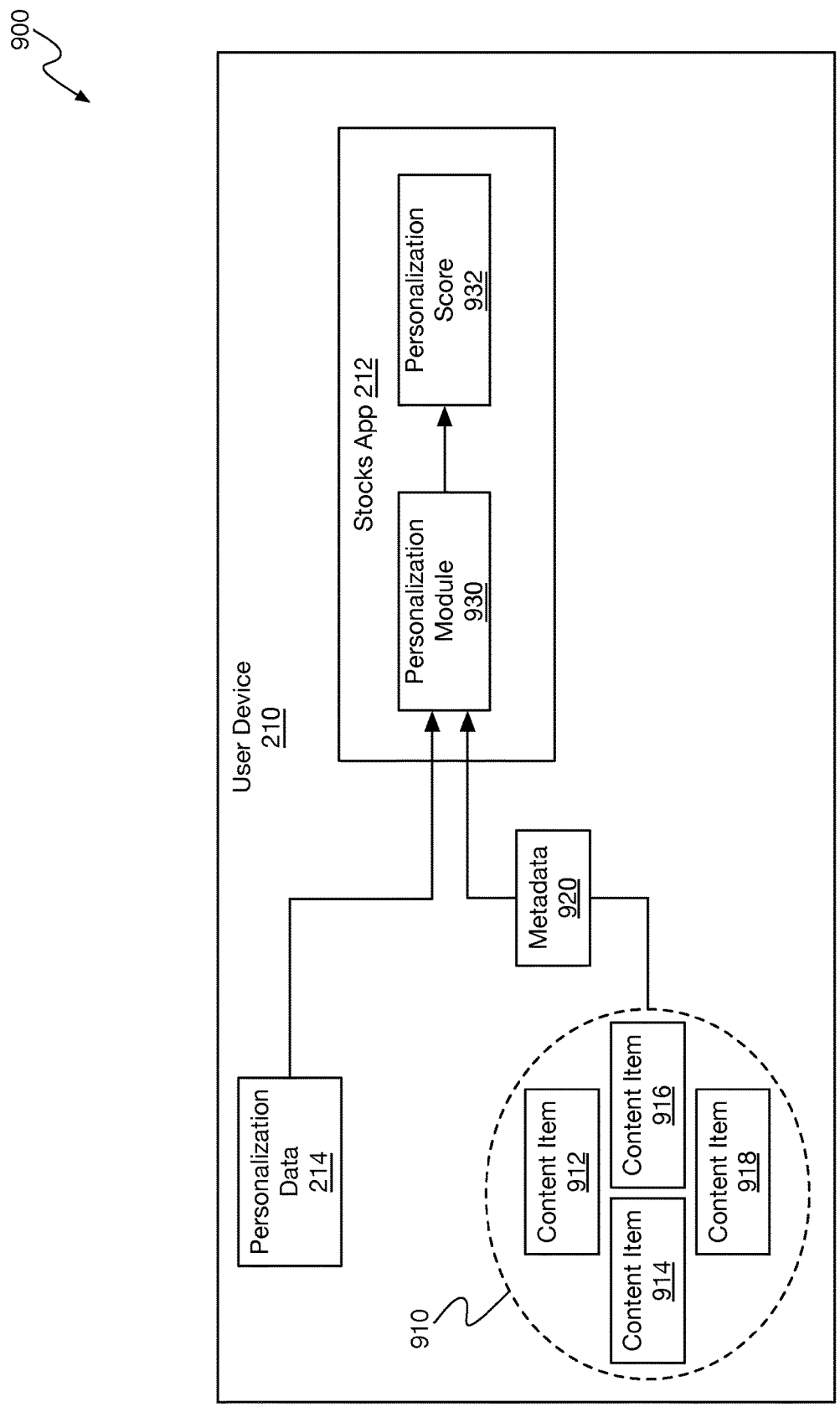
FIG. 9 is a block diagram of an example system for generating a personalization score for content items.

FIG. 9 is a block diagram of an example system 900 for generating a personalization score for content items. For example, stocks app 212 can obtain personalization data 214. Personalization data 214 can include, among other things, topics and subtopics that the user is interested in. Personalization data 214 can include content provider and/or publisher information indicating the user's preference for specific content providers and/or publishers. Personalization data 214 can include information describing securities (e.g., financial and/or investment securities) in which the user is interested. Personalization data 214 can include other user preferences, user characteristics, etc., as may be described herein.

Stocks app 212 can obtain content metadata 920. For example, content metadata 920 can be received from server device 230 in response to content request 218 specifying an investment identifier to which the user of user device 210 has subscribed. Content metadata 920 can include metadata for content items 910 (e.g., content item 912, 914, 916, 918, etc.) associated with the investment identifier included in content request 218. Content metadata 920 can include for each content item in content items 910 the content item identifier for the content item, the cluster identifier for the content item, the importance scores generated for the investment identifiers mentioned in the content item, the architype scores generated for the content item, and the publisher score generated for the content item.

In some implementations, stocks app 212 can include personalization module 930. For example, personalization module 930 can be a software module that evaluates each content item in content items 910 with respect to personalization data 214 to generate personalization score 932 for each content item. Personalization module 930 can compare the metadata for each content item to the personalization data 214 to generate a score that reflects how similar the content item is to the user's personalization data 214. For example, the metadata includes investment identifiers, publisher information, topics, or other metadata about a content item. If the metadata includes topics, publisher information, investment identifiers, etc., that correspond to topics, publisher information, investment identifiers, etc., identified in personalization data 214, then personalization module 930 can generate a high personalization score 932 for the content item. If the metadata does not include topics, publisher information, investment identifiers, etc., that correspond to topics, publisher information, investment identifiers, etc., identified in personalization data 214, then personalization module 930 can generate a low personalization score 932 for the content item. Personalization module 930 can generate a personalization score for each content item in content items 910. By evaluating content items using on-device personalization data instead of sending the personalization data to server device 230, the risk that the user's personalization data might be compromised can be reduced thereby increasing the privacy protections for the user of user device 210.

Figure 10:
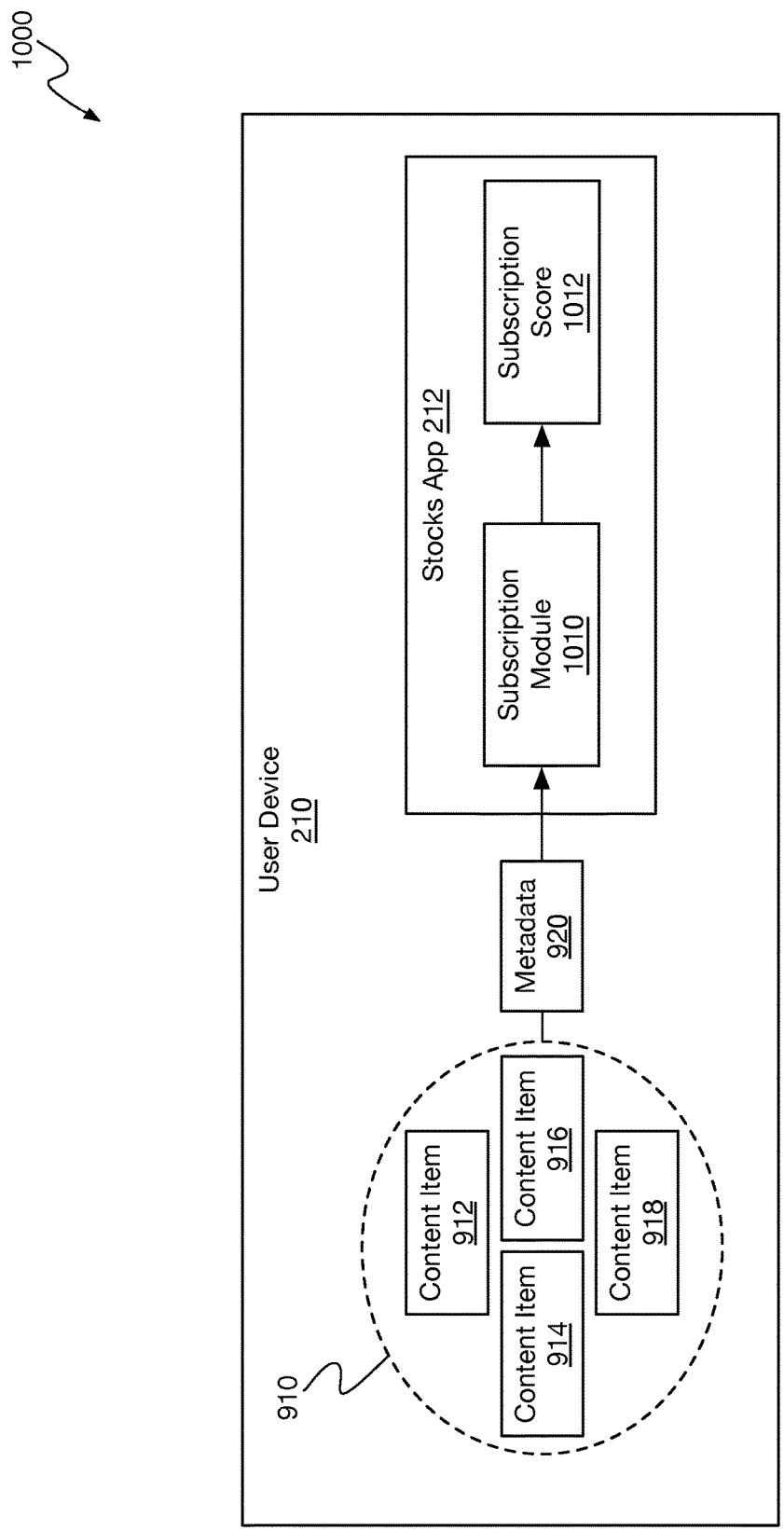
FIG. 10 is a block diagram of an example system for generating a subscription score for content items.

FIG. 10 is a block diagram of an example system 1000 for generating a subscription score for content items. In some implementations, stocks app 212 can include subscription module 1010. For example, subscription module 1010 can generate a subscription score 1012 for each content item in content items 1010 based on content item metadata 920 for each content item.

In some implementations, subscription module 1010 can generate subscription score 1012 based on the number of subscribed investment identifiers mentioned in a content item. For example, subscription module 1010 can determine the intersection between the user subscribed investment identifiers and the investment identifiers mentioned in a content item as identified in metadata 920. Subscription module 1010 can determine a number of investment identifiers in the intersection. Subscription module 1010 can generate a score based on the number. For example, if a content item and the user's securities subscription have two investment identifiers in common, then subscription module 1010 can generate a score based on the number (e.g., 2) of common investment identifier.

In some implementations, subscription module 1010 can be configured with a mapping of intersection numbers to subscription scores. For example, an intersection number zero (0) can map to subscription score zero (0). An intersection number one (1) can map to subscription score 0.5. An intersection number two (2) can map to subscription score 0.7, and so on. When subscription module 1010 determines the intersection number for a content item to be two (2) (e.g., 2 investment identifiers in common between the investment identifiers mentioned in the content item and the user's subscribed investment identifiers), then subscription module 1010 can use the number 2 to index into the subscription scores mapping to determine that the subscription score 1012 for the content item (e.g., content item 912) is 0.7.

Figure 11:
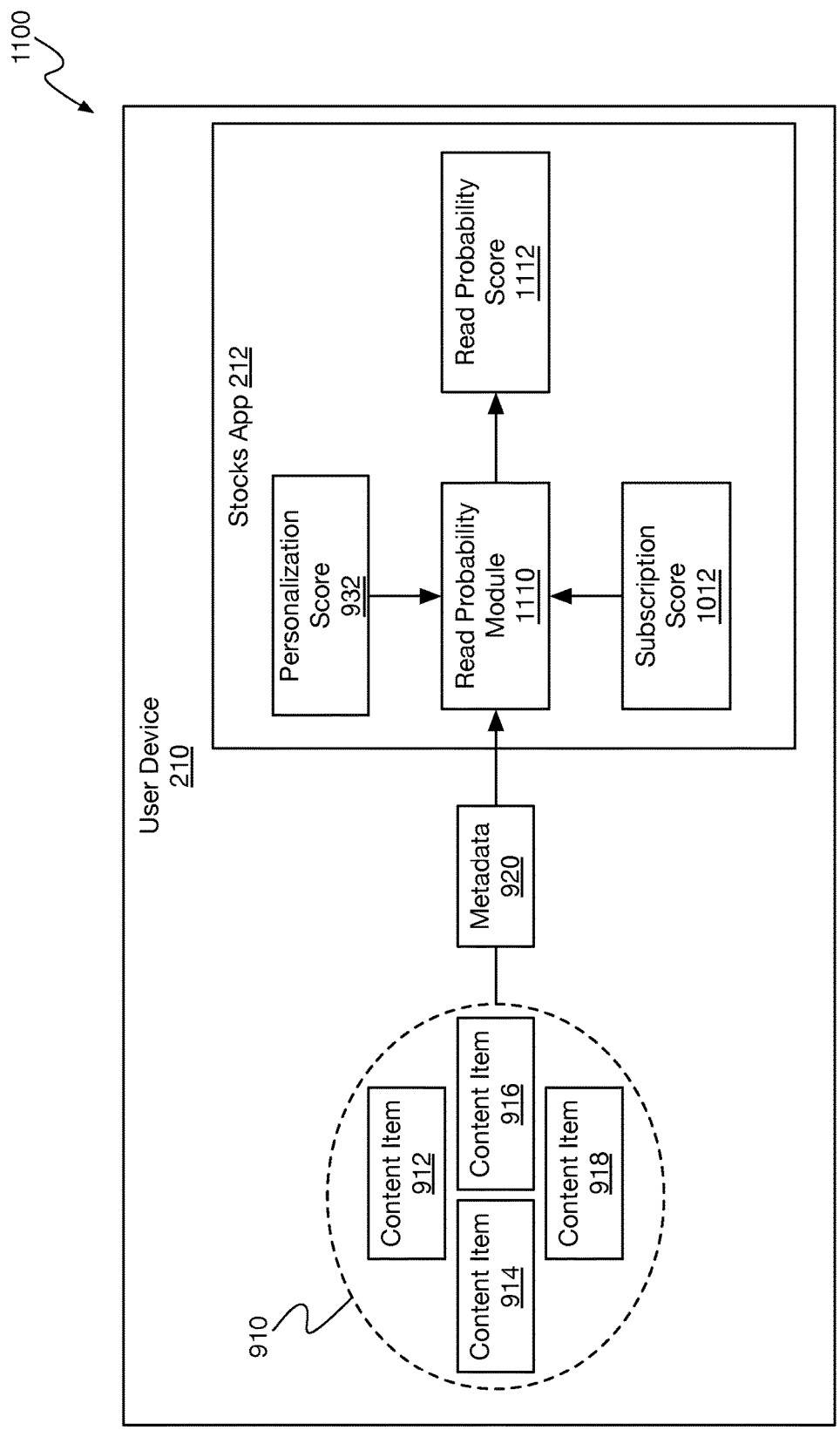
FIG. 11 is a block diagram of an example system for generating a personalized read probability score for a content item.

FIG. 11 is a block diagram of an example system 1100 for generating a personalized read probability score for a content item. In some implementations, stocks app 212 can include read probability module 1110. For example, read probability module 1110 can generate a score representing the likelihood that the user of user device 210 will read a content item. Read probability module 1110 can generate the read probability score 1112 for each content item in content items 910.

Read probability module 1110 can generate read probability score 1112 based on metadata 920, personalization score 932, and/or subscription score 1012. For example, read probability module 110 can calculate read probability score for a content item based on the server generated architype scores, importance scores, and/or publisher scores included in metadata 920 corresponding to the content item.

In some implementations, read probability module 1110 can determine the architype score for the content item corresponding to the user of user device 210. For example, read probability module 1110 can analyze the securities subscriptions, user characteristics, content consumption behavior, and other attributes of the user to determine which architype the user is associated with. Based on the determined architype for the user, read probability module 1110 can then select the corresponding architype score from the metadata for the content item.

In some implementations, read probability module 1110 can determine an importance score for the content item based on the user securities subscriptions. For example, if the user subscribes to one of the securities mentioned in the content item, then read probability module 1110 can select the importance score for the content item that corresponds to the subscribed security. If the user subscribes to multiple securities that are mentioned in the content item, then read probability module 1110 can calculate the importance score for the content item based on the combined importance scores of the multiple subscribed securities. For example, read probability module 1110 can select the highest importance score associated with the multiple subscribed securities. Read probability module 1110 can calculate an average importance score for the multiple subscribed securities. Read probability module 1110 can calculate a sum of the importance score for the multiple subscribed securities. In some implementations, read probability module 1110 can just select the importance score corresponding to the security identified in content request 218.

In some implementations, read probability module 1110 can just select the importance score corresponding to the security corresponding to the user interface grouping to be presented on GUI 100, as described above. For example, if stocks app 212 is selecting content items for the content item grouping corresponding to investment identifier 'Y', then read probability module 1110 can select the importance score corresponding to investment identifier 'Y' when determining the importance score for the content item.

In some implementations, read probability module 1110 can determine a publisher score for the content item based on the user securities subscriptions. For example, read probability module 1110 can obtain the publisher score from the metadata for the content item received in metadata 920.

After obtaining the architype score, importance score, publisher score, personalization score 932, and subscription score 1012, read probability module 1110 can generate read probability score 1112 for the content item. For example, read probability score 1112 for each individual content item can be a weighted sum of the scores (e.g., architype score, importance score, publisher score, personalization score 932, subscription score 1012, and/or combination thereof) generated for each content item as represented by the following equation (1).

$$P(a,t) = w1*\text{architypeScore}(a,t) + w2*\text{importanceScore}(a,t) + w3*\text{publisherScore}(a) + w4*\text{personalizationScore}(a) + w5*\text{subscriptionScore}(a,s) \quad (1)$$

As indicated in equation 1, the read probability score 1112 can be generated using a read probability equation (e.g., function, algorithm) $P(a, t)$ defined as a weighted sum of the architype score, importance score, publisher score, personalization score 932, and/or subscription score 1012. The architype score can be generated or selected based on the content item, or content item metadata, (a) and the investment identifier (t) requested in content request 218. The importance score can be generated or selected based on the content item, or content item metadata, (a) and the investment identifier (t) requested in content request 218. The importance score can be generated or selected based on the publisher of the content item, as described above. The personalization score can be generated or selected based on content item, or content item metadata, (a) and the user's personalization data, as described above. The subscription score can be generated or selected based on content item, or content item metadata, (a) and the user's securities subscription information (e.g., subscribed investment identifiers), as described above.

In some implementations, each of the scores used to calculate read probability score 1112 can be weighted (e.g.

w1-w5). For example, read probability module 1110 can be configured with weights (e.g., w1, w2, w3, w4, w5, etc.) that can be adjusted to tune the scoring algorithm (e.g., equation). The adjustments to the weights can be determined by server device 230 (e.g., based on experimental data, as described below) and served to stocks app 212 periodically to update the read probability score algorithm and refine or improve accuracy and effectiveness of the read probability algorithm. After the read probability score 1112 is calculated for each content item, stocks app 212 can use the read probability score 1112 for each content item to select the content items to present to the user.

Figure 12:
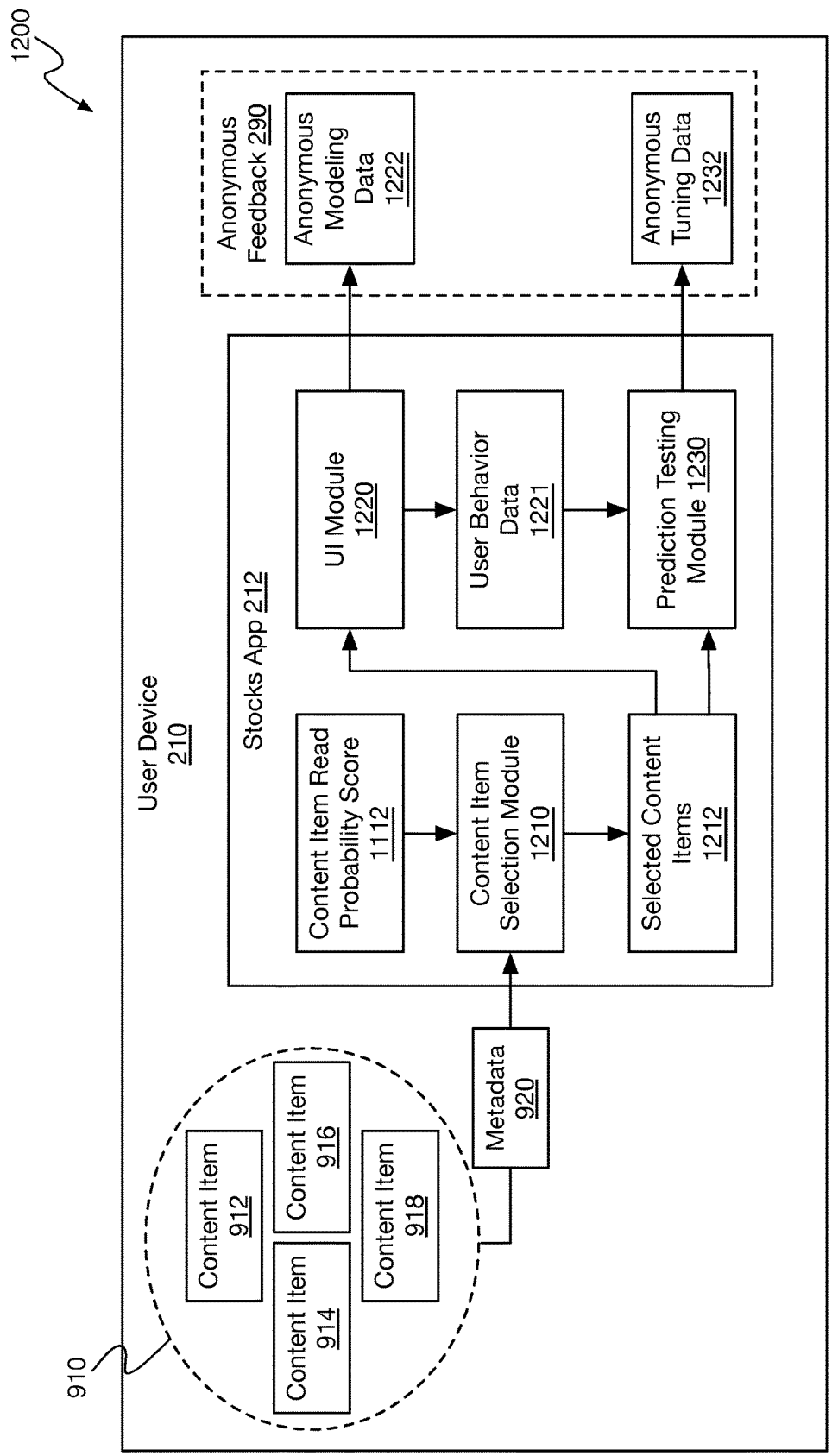
FIG. 12 is a block diagram of an example system for selecting content items to present to a user.

FIG. 12 is a block diagram of an example system 1200 for selecting content items to present to a user. For example, system 1200 can select content items from content items 910 based on the read probability scores generated for each content item in content items 910. To avoid presenting duplicate content (e.g., duplicate stories), system 1200 can select content items based on the cluster identifiers stored in metadata 920 for each content item. For example, and as described above, stocks app 212 has sent to server device 230 content request 218 including an investment identifier to which the user of user device 210 has subscribed. Stocks app 212 has received content metadata 242 from server device 230 corresponding to content items that mention the investment identifier (or corresponding security). Stocks app 212 has generated personalized read probability scores for each of the content items and now will select a limited number (e.g., 3) of the content items to present in the GUI 200 investment identifier grouping.

To select the content items the user is most likely to consume without presenting duplicate content (e.g., duplicate stories), content item selection module 1210 can sort the content items by read probability score. For example, content item selection module 1210 can sort the content items from highest read probability score to lowest probability score. To select the best 3 content items associated with the investment identifier, content item selection module 1210 can select the content item (e.g., content item 912) having the highest probability score first and record the cluster identifier for the selected content item. To select the next content item, content selection module 1210 can evaluate the content item (e.g., content item 914) that has the next highest read probability score to determine if the cluster identifier for the content item 914 is the same as the cluster identifier for the already selected content item 912. If the cluster identifier is not the same (e.g., the content item 914 describes a different story), then content selection module 1210 can select content item 914 as the second of three content items to present in the investment identifier grouping on GUI 100.

If the cluster identifier is the same (e.g., the content item 914 describes the same story as content item 912), then content selection module 1210 can evaluate the content item (e.g., content item 916) with the third highest score to determine if content item 916 has the same cluster identifier as content item 912. If the cluster identifier for content item 916 is not the same as the cluster identifier for content item 912 (e.g., content item 916 describes a different story than content item 912), then content selection module 1210 can select content item 916 as the second of three content items to present for the investment identifier grouping. The process can be repeated to select the third content item to present in the investment identifier grouping on GUI 100. To state the process in more general terms, content item selection module 1210 can select a number (e.g., 3, 4, 5, etc.) of content items (e.g., selected content items 1212) having the highest read probability scores where the selected the content items each have a different cluster identifier. This process ensures that the content items the user is most likely to consume are presented while maintaining user privacy by performing content item scoring and selection on user device 210 and while also avoiding the presentation of duplicate content (e.g., duplicate stories, duplicate articles).

After content item selection module 1210 selects the content items for presentation to the user, content item selection module 1210 can provide the selected content items (e.g., selected content items 1212) to user interface (UI) module 1220. In some implementations, content item selection module 1210 can send selected content items 1212 (e.g., selected content item metadata) to UI module 1220. UI module 1220 can generate GUI 100 and the investment identifier groupings presented on GUI 100 based on selected content items 1220, as described above.

In some implementations, UI module 1220 can send anonymous modeling data 1222 to server device 230 as anonymous feedback. For example, when a user selects to read or consume one of the content items presented on GUI 100, UI module 1220 can store data (e.g., user behavior data 1221) indicating which content items were consumed. UI module 1220 can store the content item identifiers for the consumed content items in the user behavior data 1221. UI module 1220 can determine the intersection between the investment identifiers mentioned in the consumed content items and the investment identifiers to which the user subscribes and store a list of investment identifiers that are common to both the consumed content item and the user's subscriptions in the user behavior data 1221 in association with the corresponding content item identifier. UI module 1220 can then send the user behavior data 1221 to server device 230 as anonymous modeling data 1222. The anonymous modeling data 1222 can be sent such that the anonymous modeling data 1222 cannot be used to identify the user of user device 210 or user device 210. For example, the user behavior data 1221 can be sent to server device 230 without revealing the identity of the user or user device. Server device 230 can use the anonymous modeling data to generate user architypes and model user architype content consumption behavior, as described above. As described above, these architypes are used to model the content consumption behaviors of users who have similar characteristics and/or interests without tying or linking the user characteristics, interests, or behaviors to any particular user.

In some implementations, stocks app 212 can include prediction testing module 1230. As described above, the algorithm for generating personalized read probability scores 1112 uses weights to tune the algorithm to improve the predictive scores generated by the algorithm. Prediction testing module 1230 can perform on-device (e.g., on user device 210) experiments to determine which combination of weights are most predictive of the user's past content consumption behavior. For example, content item selection module 1210 can store data identifying selected content items 1212. Content item selection module 1210 can store the metadata and various scores generated for the content items that are selected for presentation to the user of user device 210. UI module 1220 can store user behavior data 1221 that indicates which of selected content items 1212 the user has selected to consume in the past.

In some implementations, prediction testing module 1230 can test various weight combinations against the content item metadata (e.g., scores) to determine which weight value combinations generate the highest read probability scores for the content items actually consumed by the user. For example, server device 230 can send stocks app 212 weight ranges for each of the weights used in the personalized read probability algorithm. When user device 210 is idle, plugged into an external power source, and/or connected to Wi-Fi, etc., prediction testing module 1230 can generate personalized read probability scores for selected content items 1212 using various combinations of weights that fall within the server specified weight ranges. When prediction testing module 1230 determines a combination of weights that provide the highest personalized read probability scores for the content items the user actually consumed, prediction testing module can send the combination of weights to server device 230 as anonymous tuning data 1232. Since the combination of weights (e.g., a weight vector that includes the experimentally determined weights w1-w5) is sent to server device 230 without identifying the user of user device 210 or user device 210, the user's privacy can be protected.

In some implementations, server device 230 can determine a new combination of weights to provide to stocks app 212 based on the anonymous tuning data 1232. For example, server device 230 can receive anonymous tuning data 1232 (e.g., anonymous feedback 290) from many user devices 210. Server device 230 can analyze the anonymous tuning data 1232 to determine which combinations of weights allow stocks app 212 to make the best-read probability predictions (e.g., personalized read probability scores). The weights can be determined generally (e.g., across all user devices) based on which weight vectors are most frequently received from user devices. The weights can be determined for each user architype. For example, server device 230 (e.g., feedback module 240) can determine based on anonymous feedback 290 (e.g., anonymous user architype data, anonymous weight vectors, etc.) which combinations of weights are most predictive of read behaviors of different user architypes. Server device 230 can then provide configuration data to stocks app 212 that defines an architype to weight vector mapping and stocks app 212 can select the weight vector to use when generating personalization scores based on which user architype stocks app 212 determines that the user of user device 210 belongs. Thus, personalized selection of content on user device 210 can be dynamically improved based on real time anonymous feedback received from many user devices.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that include the same or similar steps described below. These different process flows are also within the contemplated scope of the technology disclosed herein. Additionally, while the processes below may omit or briefly summarize some of the details of the technologies disclosed herein for clarity, the details described in the paragraphs above should be combined with the process steps described below to get a more complete and comprehensive understanding of these processes and the technologies disclosed herein.

Figure 13:
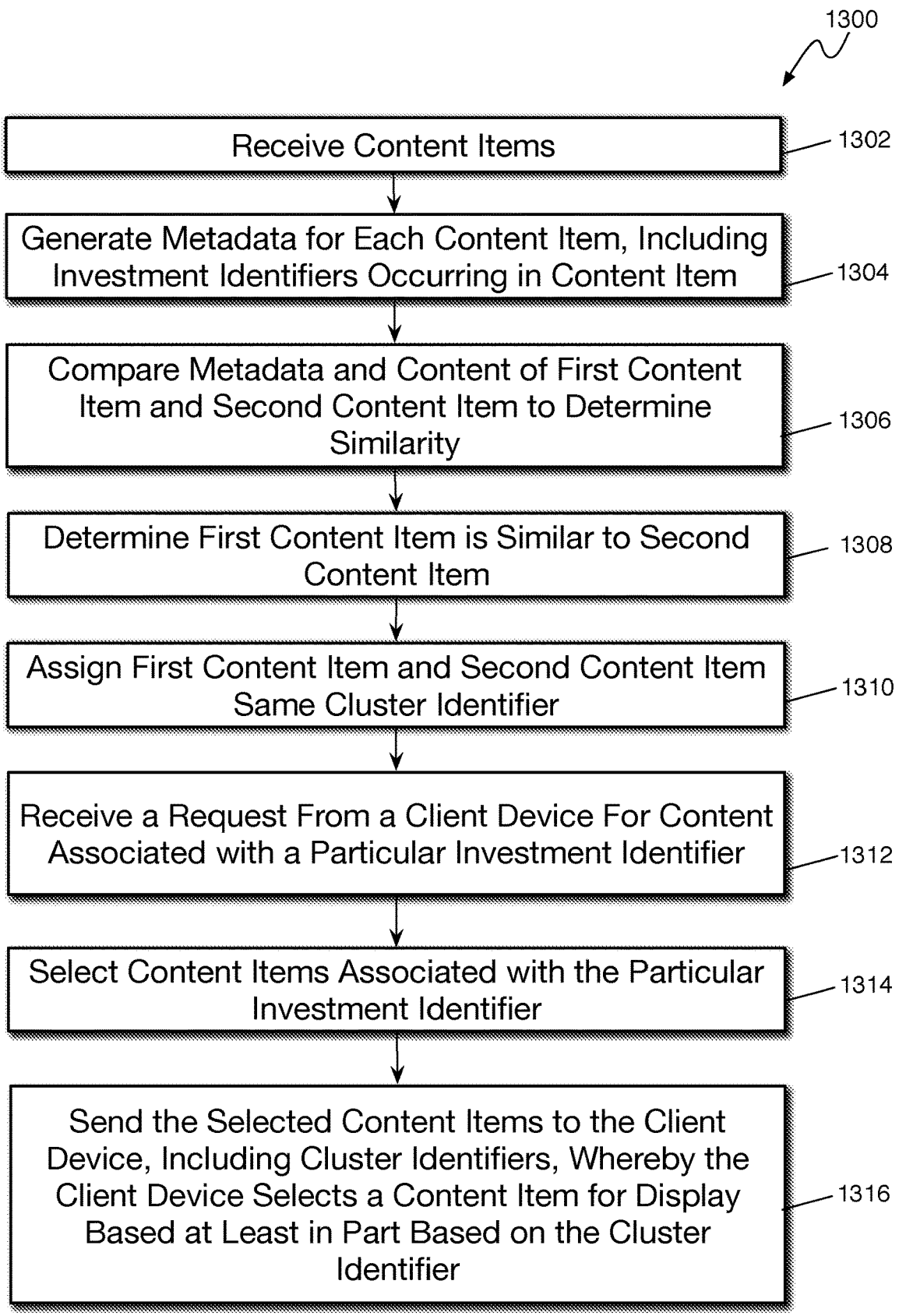
FIG. 13 is flow diagram of an example process for server-side clustering of content items.

FIG. 13 is flow diagram of an example process 1300 for server-side clustering of content items. For example, server device 230 can obtain content items (e.g., news articles, opinion pieces, reviews, stories, etc.) related to various investments. Server device 230 can cluster content items that include similar content (e.g., tell the same story, describe the same event, etc.) and assign the content items that have similar content the same cluster identifier. When selecting content items to present to a user based on the user's personalization data, the client device (e.g., user device 210) can use the cluster identifier to avoid selecting content items that include similar content. For example, by avoiding selecting content items that have the same cluster identifier, the client device can avoid presenting two content items that describe the same story to the user of the client device. This process allows for personalization of content on the client device, while performing computing resource intensive analysis of content items on server device 230.

At step 1302, server device 230 can receive content items. For example, server device 230 can receive content items (e.g., news articles, opinion pieces, event descriptions, market analysis, etc.) from various content providers. The content items received from the content providers (e.g., news outlets, publishers, media sources, etc.) can include content provider metadata, including a publisher identifier, author identifier, and/or subject tags that identify the content and/or subject matter of the content items.

At step 1304, server device 230 can generate metadata for each of the received content items. For example, the metadata can include investment identifiers occurring or mentioned within the content of the content item. The metadata can include importance scores for each investment identifier mentioned in the content item. For example, server device 230 can be configured with a dictionary of terms related to or associated with various investment identifiers. Server device 230 can spot, detect, or locate the dictionary terms within a content item, disambiguate the terms, generate location characteristics for each occurrence of terms, and generate importance scores for corresponding investment identifiers based on the location characteristics, as described herein above and below with reference to FIG. 15.

Server device 230 can generate additional metadata for a content item. For example, the server generated metadata can include one or more architype scores for the content item that represents how likely a particular class or architype of user will be to consume the content item, as describe above with reference to FIG. 6. The server generated metadata can include a publisher score the represents a ranking value for the publisher of the corresponding content item, as described above with reference to FIG. 7. The server generated metadata can include cluster identifiers that can be used to identify content items that have similar content, as described above with reference to FIG. 8. The server generated metadata can include other metadata as may be described herein above and/or below.

At step 1306, server device 230 can compare a first content item and a second content item to determine whether the content items are similar. For example, for each content item (e.g., first content item) received by server device 230, server device 230 can compare the first content item to other content items (e.g., second content item) to determine if a first content item and a second content item have similar content (e.g., tell the same story, describe the same event, etc.). In some implementations, server device 230 can compare the metadata of the content items that indicates which investment identifiers are important to the content items, as described above with reference to importance scoring module 530. The comparison can be performed by evaluating the terms and/or definitions of the terms included in the content items, as determined using conformed encyclopedia 310 described above. For example, different content items that use the same terms having the same definitions may be describing the same story or event. However, different content items that use the same terms having different definitions (e.g., Apple the company vs. apple the fruit) may be describing different stories or events. In some implementations, combinations of words (e.g., phrases, terms mentioned in proximity to each other, etc.) can be compared to determine if the first content item and the second content item have similar content.

In some implementations, the content items and/or terms therein can be compared using well-known similarity algorithms (e.g., Jaccard similarity algorithms, cosign similarity algorithms, sematic similarity algorithms, etc.) to generate a similarity score. For example, clustering module 238 can compare content items provided by different content providers and generate a score for each content item that indicates how similar the content items are. If the score is above (or below) a threshold value, then the two content items can be determined to be similar.

At step 1308, server device 230 can determine that the first content item is similar to the second content item. For example, when server device 230 determines that the first content item and the second content item include the same terms, have similar importance scores for mentioned investment identifiers, and/or have a similarity score above (or below) a threshold value, server device 230 can determine that the first content item and the second content item have similar content.

At step 1310, server device 230 can assign the first content item and the second content item the same cluster identifier. For example, server device 230 can group similar content items (e.g., content items that have similar content, tell the same story, describe the same event, etc.) into content item clusters. Each content item cluster can be assigned a cluster identifier (e.g., story identifier). For example, each content item that belongs to the same cluster can be assigned the same cluster identifier. The same cluster identifier can be stored in the metadata for each content item that is associated with the same cluster.

At step 1312, server device 230 can receive a request from a client device for content associated with a particular investment identifier. For example, server device 230 can receive a request from a client device (e.g., user device 210) including one or more investment identifiers, including the particular investment identifier, corresponding to investments to which the user has subscribed through stocks app 212 on user device 210.

At step 1314, server device 230 can select content items associated with the particular investment identifier. For example, server device 230 can compare the one or more investment identifiers, including the particular investment identifier, to metadata associated with content items received at step 1302. Server device 230 can, for example, compare the particular investment identifier to content item metadata for each content item that identifies the investments or investment identifiers mentioned or occurring in the particular content item. For example, server device 230 can compare the particular investment identifier to the mapping of investment identifiers to importance scores in content item metadata to determine if a content item mentions the particular investment identifier. If the content item metadata includes the particular investment identifier, server device can select the corresponding content item or content items.

At step 1316, server device 230 can send the selected content items to the client device. For example, server device 230 can send the selected content items and/or content item metadata to stocks app 212 on user device 210. The content item metadata for each content item sent to user device 210 can include a content item identifier (e.g., uniform resource locator, link, pointer, etc.), a cluster identifier, a mapping of investment identifiers and importance scores, a publisher score, a publisher identifier, one or more architype scores, topic tags, and/or other metadata as described herein.

Figure 14:
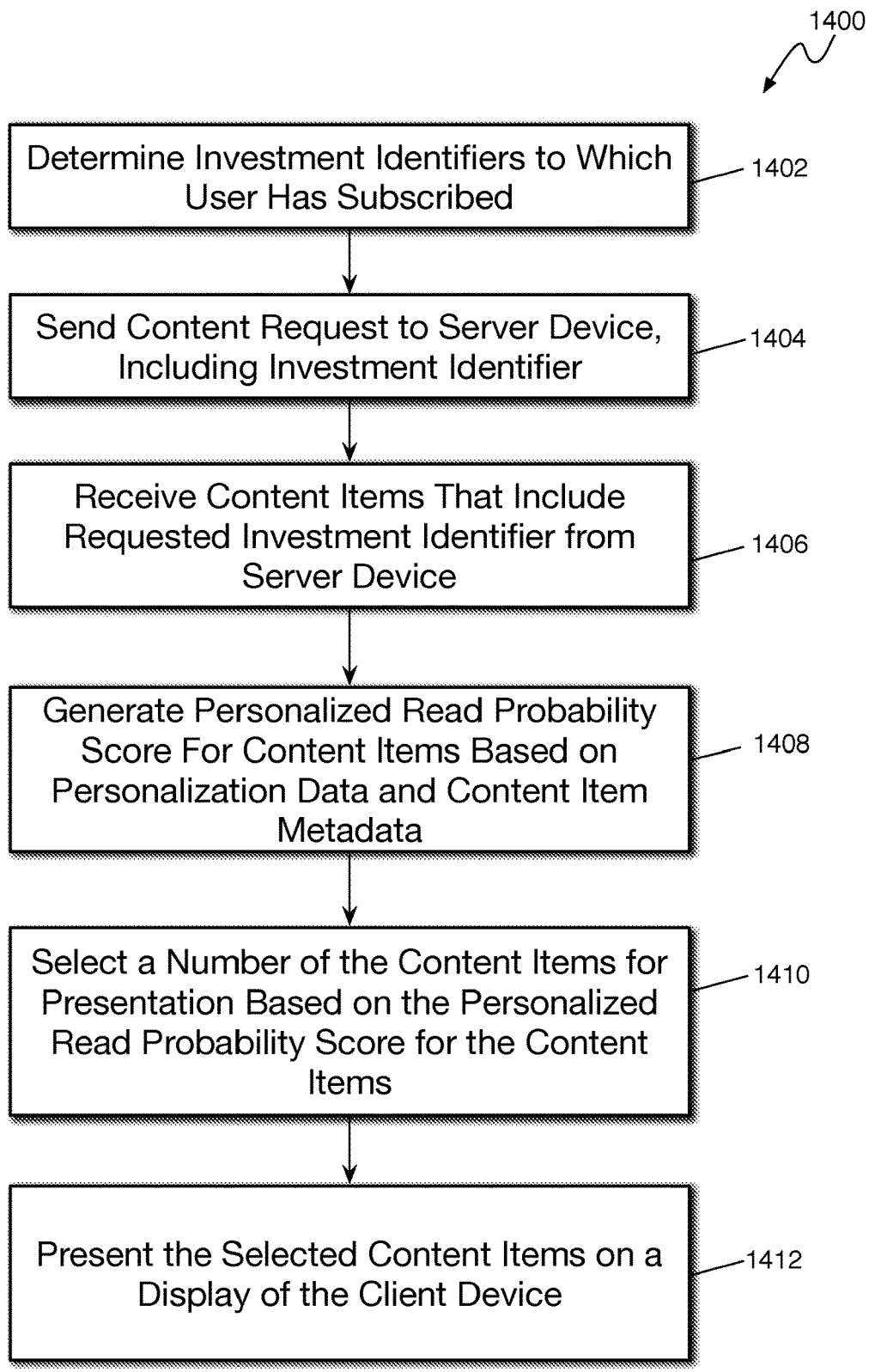
FIG. 14 is a flow diagram of an example process for client-side personalized content selection.

FIG. 14 is a flow diagram of an example process 1400 for client-side personalized content selection. For example, a client device (e.g., user device 210) can request content items (e.g., news articles, opinion pieces, market analysis, etc.) related to investment identifier to which a user of the client device has subscribed. The client device can receive the content items and select content items to present to the user based on personalization data stored on the client device. By performing the personalized selection of content on the client device and not distributing the user's personalization data to other devices (e.g., server device 230), the user's personalization data can be safe guarded on the client device and the user's private information can be protected.

At step 1402, user device 210 can determine investment identifiers to which the user of user device 210 has subscribed. For example, the user can interact with a graphical user interface (GUI) of stocks app 212 to select investments and/or investment identifiers in which the user of user device 210 is interested. Stocks app 212 can store investment identifiers corresponding to the selected investments and/or investment identifiers on user device 210.

At step 1404, user device 210 can send a request for content items to server device 230. For example, to obtain content to present to the user of user device 210, stocks app 212 can generate a request for content items that includes the investment identifiers corresponding to investments to which the user has subscribed. Stocks app 212 can obtain the investment identifiers from the investment identifiers stored on user device 212 at step 1402.

At step 1406, user device 210 can receive content items that include the requested investment identifiers from server device 230. For example, upon receiving the content request send by user device 210 at step 1404, server device 230 can generate determine and/or select content items that mention the investment identifiers sent in the content request. Server device 230 can send the selected content items and/or content item metadata associated with the selected content items to user device 210. The content item metadata can include for each content item a content item identifier, a cluster identifier, a mapping of investment identifiers to importance scores, a publisher identifier, a publisher score, one or more user architype scores, and/or other content item metadata as may be described herein.

At step 1408, user device 210 can generate a personalized read probability score for each received content item based on the user's personalization data and the content item metadata. For example, stocks app 212 can generate a subscription score a content item based on the user's investment subscriptions and the content and/or metadata for the content item, as described with reference to FIG. 10 above. Stocks app 212 can generate a personalization score for the content item based on the user's personalization data and the content and/or metadata for the content item, as described with reference to FIG. 11 above. Stocks app 212 can generate a personalized read probability score for the content item based on the subscription score, the personalization score, the publisher score, the importance scores, the architype score, and/or other metadata, as described above with reference to FIG. 12.

At step 1410, user device 210 can select a number of the content items for presentation based on the personalized read probability score generated for the content items generated at step 1408. For example, stocks app 212 can be configured to present a number (e.g., 3, 4, 5, etc.) of content items to the user, as described above with reference to GUI 100. To select the content items for presentation, stocks app 212 can select a number of content items that have the highest personalized read probability scores. For example, stocks app 212 can select the three content items that have the highest read probability scores.

However, just selecting the top three highest scored content items may cause stocks app 212 to present similar or duplicate content items (e.g., content items that tell the same story). Thus, in some implementations, stocks app 212 can select content items to present to the user based on the personalized read probability scores for the content items and the cluster identifiers for the content items. For example, if stocks app 212 only selects one content item from each content item cluster (as identified by the cluster identifier), then stocks app 212 can ensure that similar, or duplicate, content items are not presented to the user. Thus, stocks app 212 can select the three content items that have the highest personalized read probability scores and that also have different cluster identifiers, as described above with reference to FIG. 12.

At step 1412, user device 210 can present the selected content items on a display of user device 210. For example, stocks app 212 can present the number of selected content items on a graphical user interface of stocks app 212, as described with reference to FIG. 1 above.

Figure 15:
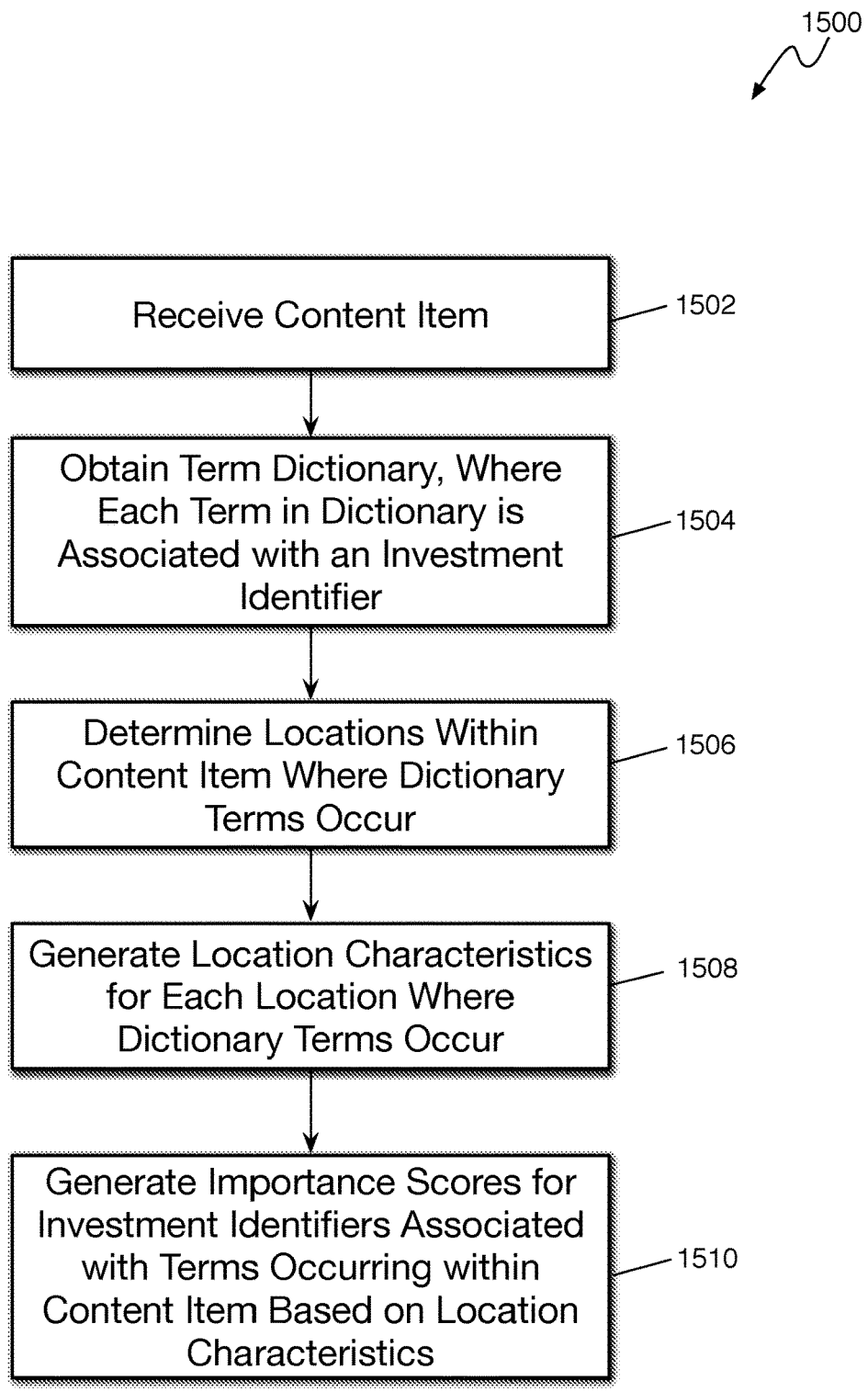
FIG. 15 is a flow diagram of an example process for generating importance scores for investment identifiers mentioned in a content item.

FIG. 15 is a flow diagram of an example process 1500 for generating importance scores for investment identifiers mentioned in a content item. For example, server device 230 can determine which investment identifiers are mentioned, or occur, within a content item and generate an importance score for each of the mentioned investment identifiers. The importance score can represent how important or relevant each investment identifier is to the content item. For example, server device 230 will generate a higher importance score for an investment identifier representing an investment that is the focus of the content of the content item. Server device 230 will generate a lower importance score for an investment identifier representing an investment that is not the focus of or merely tangentially mentioned in the content of the content item. The importance scores can be used to determine what the content item is about (e.g., is it related to a user subscribed investment identifier) and/or to determine how likely the user is to consume the content item, as described above.

At step 1502, server device 230 can receive a content item. For example, server device 230 can receive content items from various content providers, as described above. The content items can be finance or investment related content items, for example.

At step 1504, server device 230 can obtain a term dictionary. For example, the term dictionary can be obtained from storage associated with server device 230. The term dictionary can be generated by server device 230 based on an analysis of reference data sources that describes relationships between terms. For example, an online encyclopedia may describe a company, the company's executive officers, the company's products, etc. Server device 230 can analyze the online encyclopedia to identify of these items (e.g., company name, names of executives, names of products, etc.) and store them as terms in the dictionary. These terms can be mapped to the investment identifier associated with the company (e.g., also a dictionary term) in the dictionary. In some implementations, the term dictionary can be configured by administrative users and stored on server device 230.

At step 1506, server device 230 can determine locations within the content items where the dictionary terms occur. For example, server device 230 can compare the terms in the dictionary to the content of each content item to determine locations where the dictionary terms occur (e.g., are mentioned) in the content item. To avoid misidentifying locations and/or terms, server device 230 can disambiguate terms that may have multiple meanings or definitions, as described above. If the disambiguation process determines that the meaning of the term in the content item is the same as the meaning of the term in the term dictionary, then server device can generate and store location characteristics for the occurrence of the term within the content item. For example, server device 230 can generate location characteristics for each occurrence of a dictionary term in the content item.

At step 1508, server device 230 can generate location characteristics for each location where dictionary terms occur within the content item. For example, the location characteristics can include a character count from the beginning of the content item to where the term occurs. The location characteristics can include a structural element (e.g., title, header, paragraph number, first paragraph sentence, last paragraph sentence, abstract, summary, etc.) of the content item in which the term occurs. The location characteristics can include a term's relative location in relation to other terms. For example, if a first investment identifier is mentioned before a second investment identifier is mentioned, then the first investment identifier may be more important to the content of the content item than the second investment identifier. Other location characteristics may be generated, as described herein.

At step 1510, server device 230 can generate importance scores for investment identifiers associated with terms occurring within the content item based on the location characteristics of each term occurrence. For example, each term can be considered a proxy for the investment identifier with which it is associated. Thus, each occurrence of a term associated with a particular investment identifier can be considered a mention or occurrence of the particular investment identifier in the content item. Server device 230 can generate importance scores based on the locations (e.g., location characteristics) and number of occurrences of the particular investment identifier. For example, server device 230 will generate higher importance scores for investment identifiers that occur more frequently and/or in more prominent locations (e.g. title, header, abstract, etc.) within the content item. Server device 230 will generate lower importance scores for investment identifiers that occur less frequently and/or in less prominent locations within the content item.

In some implementations, server device 230 can use a machine learning model to generate importance scores for investment identifiers mentioned or occurring within a content item. For example, the features of the machine learning model can correspond to the dictionary terms and/or location characteristics of the occurrences of terms mentioned in the content item. The machine learning model can receive a content item as input and generate an importance score based on the model features that indicate how important an investment identifier is to the content of the content item. In some implementations, the importance score for a particular investment identifier can be a combination (e.g., sum, average, etc.) of the scores generated by multiple machine learning models.

Figure 16:
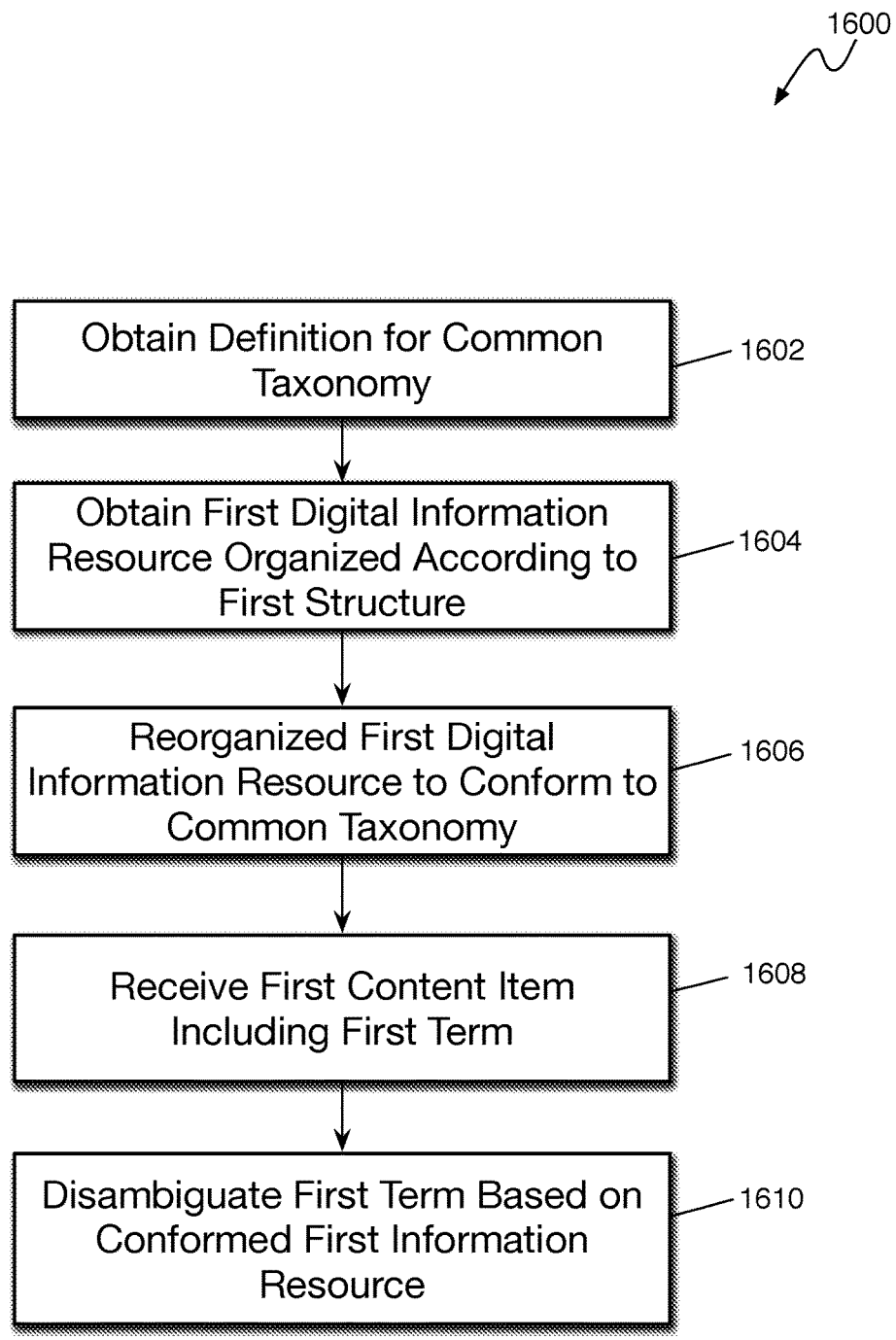
FIG. 16 is a flow diagram of an example process for conforming a digital information resource to a common taxonomy.

FIG. 16 is a flow diagram of an example process 1600 for conforming a digital information resource to a common taxonomy. For example, server device 230 can conform a digital encyclopedia obtained from a network source to a common taxonomy (e.g., a well-known U.S. news taxonomy) so that accessing information in (e.g., traversing) the digital encyclopedia can be performed in a more efficient manner.

At step 1602, server device 230 can obtain a definition for a common taxonomy. For example, the common taxonomy can define an organization, classification, and/or structure for content or content items based on the subject or focus of the content. The common taxonomy can, for example, correspond to a well-known news taxonomy as used by many news media providers.

At step 1604, server device 230 can obtain a first digital information resource organized according to a first structure. For example, the first digital information resource can correspond to an online, digital encyclopedia that provides descriptions of various subjects, topics, entities (e.g., people, businesses, products, etc.), and/or events. The digital encyclopedia can be generated for consumption by people living in a particular geographic region. Thus, the digital encyclopedia may be written using a language and/or organization structure that is specific, or particular, to the particular geographic region. The digital encyclopedia may, therefore, be written in a different language and use a different organization structure than other digital encyclopedias and/or may not conform to the common taxonomy obtained at step 1602.

At step 1606, server device 230 can reorganize the first information resource so that it conforms to the common taxonomy. For example, the common taxonomy can be viewed as a tree that defines the classification hierarchy of subjects that may be described in the content of content items. The digital encyclopedia can also be viewed as a tree that defines the hierarchical organization of the digital encyclopedia. When the taxonomy tree is compared to the encyclopedia tree, the organization of the two trees may be found to be different. For example, high-level, broad categories in the taxonomy tree may not find corresponding categories at the same tree level within the encyclopedia tree. Sub-categories or subtopics in the encyclopedia tree, may depend from different nodes is the encyclopedia tree than the same sub-categories or subtopics depend from in the taxonomy tree. When differences between the organization structure of the digital encyclopedia and the common taxonomy are found, server device 230 can rearrange or reorganize the digital encyclopedia so that the organizational structure of the digital encyclopedia conforms to or matches the organizational structure of the common taxonomy. To do so, server device 230 can create or delete links between parent (e.g., category) and child (subtopic) nodes in the digital encyclopedia. Server device 230 can add and remove nodes (e.g., categories, subtopics, definitions, etc.) from the organizational structure of the digital encyclopedia.

At step 1608, server device 230 can receive a first content item, including a first term. For example, server device 230 can receive a content item that includes a term (e.g., word, phrase, dictionary term, etc.) that has multiple meanings.

At step 1610, server device 230 can disambiguate the first term based on the conformed first information resource. For example, by using the conformed digital encyclopedia (e.g., conformed to the common taxonomy) that is organized according to a well-known, expected taxonomy, server device 230 can locate the definitions for a particular term within the digital encyclopedia in a more efficient and predictable manner. After the various definitions for the particular term have been found, server device 230 can compare each of the term definitions to the content of the content item to determine which term definition has the most in common with the content of the content item. For example, if the ambiguous term is "apple", the digital encyclopedia can include multiple definitions that may include apple the fruit and Apple the computer company. By comparing words, phrases, objects, tokens, etc., in the encyclopedia definitions to words, phrases, objects, tokens, etc., in the content of the content item, server device 230 can select the term definition that is best represented by the content item. For example, if the content item includes references to trees, agriculture, fruit, etc., these references will find correspondence in the encyclopedia definition for apple the fruit and server device 230 can determine that the content item is related to apple the fruit. However, if the content item includes references to computers, smartphones, Apple company executives, etc., these references will find correspondence in the encyclopedia definition for Apple the company and server device 230 can determine that the content item is related to Apple the technology company.

In some implementations, server device 230 can perform process 1600 for each dictionary term found in each content item received from the various content providers 260, 270, 280. Thus, server device 230 may perform steps 1608 and 1610 many times for each content item received by server device 230.

Additionally, server device 230 may obtain more than one digital information resource. For example, server device 230 may obtain an English language encyclopedia that conforms to a United States taxonomy. Server may obtain a French language encyclopedia that conforms to a French news taxonomy that is different than the U.S. news taxonomy. Server device 230 can conform both the English language encyclopedia and the French language encyclopedia to the common taxonomy and use both the English encyclopedia and the French encyclopedia to perform the disambiguation process, as described above.

Graphical User Interfaces

This disclosure above describes various graphical user interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described herein, one aspect of the present technology is the gathering and use of data available from specific and legitimate sources to improve the delivery to users of investment related content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of content delivery services, the present technology can be configured to allow users to select to "opt in" or "opt out" of participation in the collection of personal information data during registration for services or anytime thereafter. In another example, users can select not to provide anonymous feedback data to server devices to be used in generating user architype models.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Figure 17:
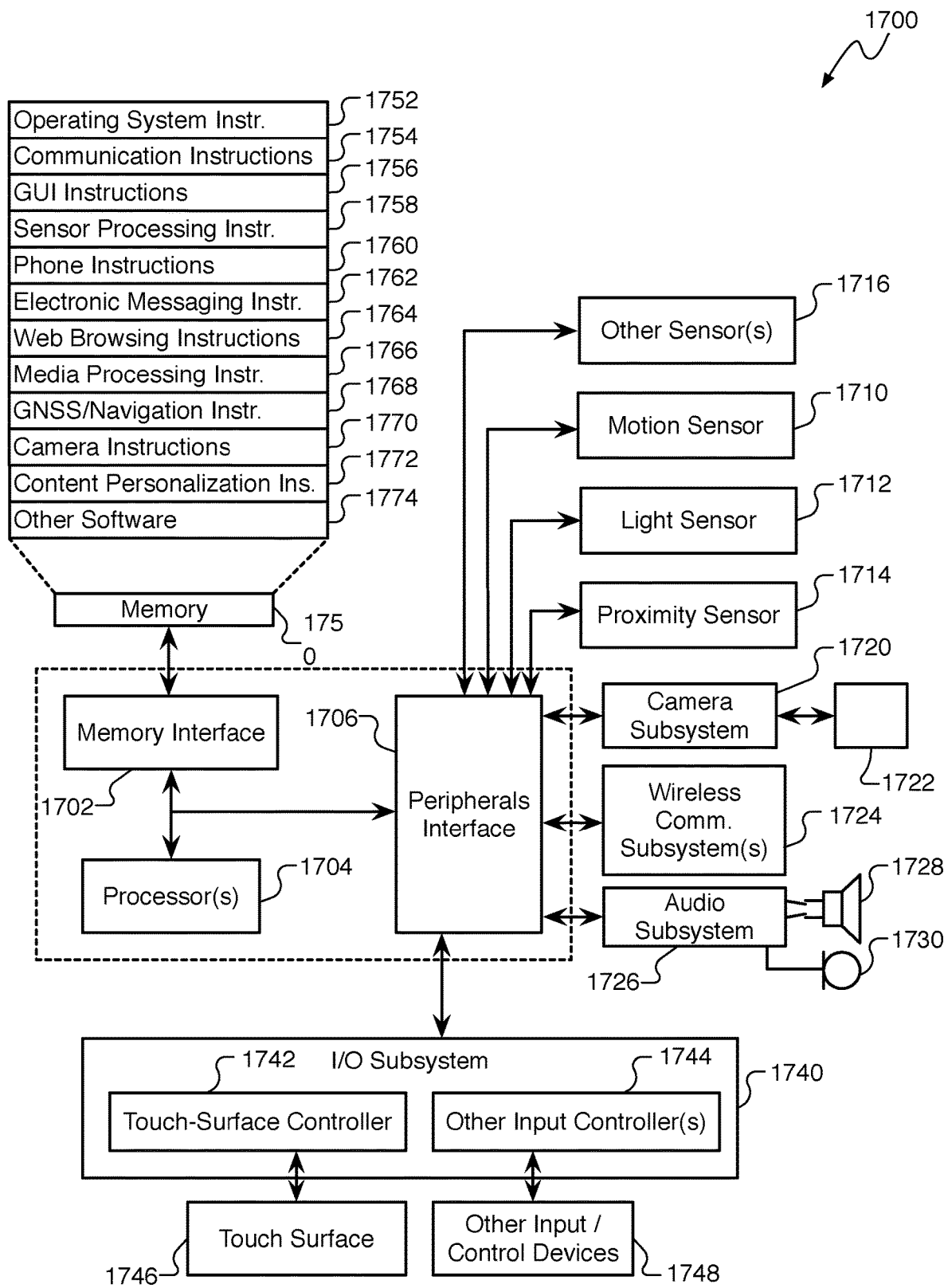
FIG. 17 is a block diagram of an example computing device that can implement the features and processes of FIGS. 1-16.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services Example System Architecture FIG. 17 is a block diagram of an example computing device 1700 that can implement the features and processes of FIGS. 1-16. The computing device 1700 can include a memory interface 1702, one or more data processors, image processors and/or central processing units 1704, and a peripherals interface 1706. The memory interface 1702, the one or more processors 1704 and/or the peripherals interface 1706 can be separate components or can be integrated in one or more integrated circuits. The various components in the computing device 1700 can be coupled by one or more communication buses or signal lines.

Sensors, devices, and subsystems can be coupled to the peripherals interface 1706 to facilitate multiple functionalities. For example, a motion sensor 1710, a light sensor 1712, and a proximity sensor 1714 can be coupled to the peripherals interface 1706 to facilitate orientation, lighting, and proximity functions. Other sensors 1716 can also be connected to the peripherals interface 1706, such as a global navigation satellite system (GNSS) (e.g., GPS receiver), a temperature sensor, a biometric sensor, magnetometer or other sensing device, to facilitate related functionalities.

A camera subsystem 1720 and an optical sensor 1722, e.g., a charged coupled device (CCD) or a complementary metal-oxide semiconductor (CMOS) optical sensor, can be utilized to facilitate camera functions, such as recording photographs and video clips. The camera subsystem 1720 and the optical sensor 1722 can be used to collect images of a user to be used during authentication of a user, e.g., by performing facial recognition analysis.

Communication functions can be facilitated through one or more wireless communication subsystems 1724, which can include radio frequency receivers and transmitters and/or optical (e.g., infrared) receivers and transmitters. The specific design and implementation of the communication subsystem 1724 can depend on the communication network(s) over which the computing device 1700 is intended to operate. For example, the computing device 1700 can include communication subsystems 1724 designed to operate over a GSM network, a GPRS network, an EDGE network, a Wi-Fi or WiMax network, and a Bluetooth™ network. In particular, the wireless communication subsystems 1724 can include hosting protocols such that the device 100 can be configured as a base station for other wireless devices.

An audio subsystem 1726 can be coupled to a speaker 1728 and a microphone 1730 to facilitate voice-enabled functions, such as speaker recognition, voice replication, digital recording, and telephony functions. The audio subsystem 1726 can be configured to facilitate processing voice commands, voice printing and voice authentication, for example.

The I/O subsystem 1740 can include a touch-surface controller 1742 and/or other input controller(s) 1744. The touch-surface controller 1742 can be coupled to a touch surface 1746. The touch surface 1746 and touch-surface controller 1742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1746.

The other input controller(s) 1744 can be coupled to other input/control devices 1748, such as one or more buttons, rocker switches, thumb-wheel, infrared port, USB port, and/or a pointer device such as a stylus. The one or more buttons (not shown) can include an up/down button for volume control of the speaker 1728 and/or the microphone 1730.

In one implementation, a pressing of the button for a first duration can disengage a lock of the touch surface 1746; and a pressing of the button for a second duration that is longer than the first duration can turn power to the computing device 1700 on or off. Pressing the button for a third duration can activate a voice control, or voice command, module that enables the user to speak commands into the microphone 1730 to cause the device to execute the spoken command. The user can customize a functionality of one or more of the buttons. The touch surface 1746 can, for example, also be used to implement virtual or soft buttons and/or a keyboard.

In some implementations, the computing device 1700 can present recorded audio and/or video files, such as MP3, AAC, and MPEG files. In some implementations, the computing device 1700 can include the functionality of an MP3 player, such as an iPod™.

The memory interface 1702 can be coupled to memory 1750. The memory 1750 can include high-speed random-access memory and/or non-volatile memory, such as one or more magnetic disk storage devices, one or more optical storage devices, and/or flash memory (e.g., NAND, NOR). The memory 1750 can store an operating system 1752, such as Darwin, RTXC, LINUX, UNIX, OS X, WINDOWS, or an embedded operating system such as VxWorks.

The operating system 1752 can include instructions for handling basic system services and for performing hardware dependent tasks. In some implementations, the operating system 1752 can be a kernel (e.g., UNIX kernel). In some implementations, the operating system 1752 can include instructions for performing voice authentication. For example, operating system 1752 can implement the content personalization features as described with reference to FIGS. 1-16.

The memory 1750 can also store communication instructions 1754 to facilitate communicating with one or more additional devices, one or more computers and/or one or more servers. The memory 1750 can include graphical user interface instructions 1756 to facilitate graphic user interface processing; sensor processing instructions 1758 to facilitate sensor-related processing and functions; phone instructions 1760 to facilitate phone-related processes and functions; electronic messaging instructions 1762 to facilitate electronic-messaging related processes and functions; web browsing instructions 1764 to facilitate web browsing-related processes and functions; media processing instructions 1766 to facilitate media processing-related processes and functions; GNSS/Navigation instructions 1768 to facilitate GNSS and navigation-related processes and instructions; and/or camera instructions 1770 to facilitate camera-related processes and functions.

The memory 1750 can store software instructions 1772 to facilitate other processes and functions, such as the content personalization processes and functions as described with reference to FIGS. 1-16.

The memory 1750 can also store other software instructions 1774, such as web video instructions to facilitate web video-related processes and functions; and/or web shopping instructions to facilitate web shopping-related processes and functions. In some implementations, the media processing instructions 1766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1750 can include additional instructions or fewer instructions. Furthermore, various functions of the computing device 1700 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:
1. A method comprising:
  receiving, by a server device, a content item including content;
  obtaining, by the server device, a dictionary of terms, each term in the dictionary of terms associated with a respective investment identifier;
  determining, by the server device, locations of occurrences of the terms within the content of the content item;
  generating, by the server device, location characteristics for each location of the locations of occurrences of the terms within the content of the content item;

generating, by the server device, importance scores for each investment identifier associated with the terms occurring within the content item based on the location characteristics.

2. The method of claim 1, further comprising:
determining that a particular investment identifier has been occurred within the content of the content item when the particular investment identifier or an equivalent to the investment identifier is located within the content item.

3. The method of claim 2, wherein an equivalent to the investment identifier includes a name of a person, a name of a product, nickname, or an alias associated with the investment identifier.

4. The method of claim 1, wherein the location characteristics include a character count from a beginning of the content of the content item.

5. The method of claim 1, wherein the location characteristics include a first location of an occurrence of a first investment identifier relative to a second location of an occurrence of a second investment identifier within the content item.

6. The method of claim 1, wherein the location characteristics include a structural element of the content item in which the term occurs, where the structural element corresponds to a title, a paragraph, a first line in a paragraph, a last line in a paragraph, an abstract section, a summary section, or a combination thereof.

7. The method of claim 1, wherein the importance scores for each of the investment identifiers are generated based on a machine learning model having features corresponding to the location characteristics of each dictionary term occurring in the content item.

8. A non-transitory computer readable medium including one or more sequences of instructions that, when executed by one or more processors, cause the processors to perform operations comprising:
receiving, by a server device, a content item including content;
obtaining, by the server device, a dictionary of terms, each term in the dictionary of terms associated with a respective investment identifier;
determining, by the server device, locations of occurrences of the terms within the content of the content item;
generating, by the server device, location characteristics for each location of the locations of occurrences of the terms within the content of the content item;
generating, by the server device, importance scores for each investment identifier associated with the terms occurring within the content item based on the location characteristics.

9. The non-transitory computer readable medium of claim 8, wherein the instructions cause the processors to perform operations comprising:
determining that a particular investment identifier has been occurred within the content of the content item when the particular investment identifier or an equivalent to the investment identifier is located within the content item.

10. The non-transitory computer readable medium of claim 9, wherein an equivalent to the investment identifier includes a name of a person, a name of a product, nickname, or an alias associated with the investment identifier.

11. The non-transitory computer readable medium of claim 8, wherein the location characteristics include a character count from a beginning of the content of the content item.

12. The non-transitory computer readable medium of claim 8, wherein the location characteristics include a first location of an occurrence of a first investment identifier relative to a second location of an occurrence of a second investment identifier within the content item.

13. The non-transitory computer readable medium of claim 8, wherein the location characteristics include a structural element of the content item in which the term occurs, where the structural element corresponds to a title, a paragraph, a first line in a paragraph, a last line in a paragraph, an abstract section, a summary section, or a combination thereof.

14. The non-transitory computer readable medium of claim 8, wherein the importance scores for each of the investment identifiers are generated based on a machine learning model having features corresponding to the location characteristics of each dictionary term occurring in the content item.

15. A system comprising:
one or more processors; and
a non-transitory computer readable medium including one or more sequences of instructions that, when executed by the one or more processors, cause the processors to perform operations comprising:
receiving, by a server device, a content item including content;
obtaining, by the server device, a dictionary of terms, each term in the dictionary of terms associated with a respective investment identifier;
determining, by the server device, locations of occurrences of the terms within the content of the content item;
generating, by the server device, location characteristics for each location of the locations of occurrences of the terms within the content of the content item;
generating, by the server device, importance scores for each investment identifier associated with the terms occurring within the content item based on the location characteristics.

16. The system of claim 15, wherein the instructions cause the processors to perform operations comprising:
determining that a particular investment identifier has been occurred within the content of the content item when the particular investment identifier or an equivalent to the investment identifier is located within the content item.

17. The system of claim 16, wherein an equivalent to the investment identifier includes a name of a person, a name of a product, nickname, or an alias associated with the investment identifier.

18. The system of claim 15, wherein the location characteristics include a character count from a beginning of the content of the content item.

19. The system of claim 15, wherein the location characteristics include a first location of an occurrence of a first investment identifier relative to a second location of an occurrence of a second investment identifier within the content item.

20. The system of claim 15, wherein the location characteristics include a structural element of the content item in which the term occurs, where the structural element corresponds to a title, a paragraph, a first line in a paragraph, a last line in a paragraph, an abstract section, a summary section, or a combination thereof.

21. The system of claim 15, wherein the importance scores for each of the investment identifiers are generated based on a machine learning model having features corresponding to the location characteristics of each dictionary term occurring in the content item.

\* \* \* \* \*